(12) United States Patent
Sebbah et al.

(10) Patent No.: US 10,664,359 B2
(45) Date of Patent: May 26, 2020

(54) DETERMINING A REPLICATION PATH FOR RESOURCES OF DIFFERENT FAILURE DOMAINS

(71) Applicant: Oracle International Corporation, Redwood Shores, CA (US)

(72) Inventors: Samir Sebbah, Medford, MA (US); Claire M. Bagley, Somerville, MA (US)

(73) Assignee: Oracle International Corporation, Redwood Shores, CA (US)

( * ) Notice: Subject to any disclaimer, the term of this patent is extended or adjusted under 35 U.S.C. 154(b) by 163 days.

(21) Appl. No.: 15/881,332

(22) Filed: Jan. 26, 2018

(65) Prior Publication Data
US 2018/0165160 A1 Jun. 14, 2018

Related U.S. Application Data

(63) Continuation of application No. 15/003,495, filed on Jan. 21, 2016, now Pat. No. 9,916,208.

(51) Int. Cl.
| | | |
|---|---|---|
| *G06F 11/00* | (2006.01) | |
| *G06F 11/14* | (2006.01) | |
| *G06F 11/20* | (2006.01) | |

(52) U.S. Cl.
CPC ...... *G06F 11/1464* (2013.01); *G06F 11/1456* (2013.01); *G06F 11/2094* (2013.01); *G06F 11/2097* (2013.01)

(58) Field of Classification Search
CPC ............. G06F 11/1464; G06F 11/1456; G06F 11/1415; G06F 11/1446; G06F 11/1458; G06F 11/2094; G06F 11/2097
See application file for complete search history.

(56) References Cited

U.S. PATENT DOCUMENTS

| | | | |
|---|---|---|---|
| 8,560,639 B2 | 10/2013 | Murphy et al. | |
| 8,688,500 B1 * | 4/2014 | Hart | G06Q 10/0635 |
| | | | 705/7.28 |
| 8,930,747 B2 | 1/2015 | Levijarvi et al. | |
| 9,077,613 B2 | 7/2015 | Deng et al. | |

(Continued)

OTHER PUBLICATIONS

Zhang et al., "A Data Replica Placement Scheme for Cloud Storage under Healthcare IoT Environment", 11th International Conference on Fuzzy Systems and Knowledge Discovery (FSKD), Aug. 19-21, 2014, retrieved on Dec. 17, 2015, 2 pages.

(Continued)

*Primary Examiner* — Joseph D Manoskey
(74) *Attorney, Agent, or Firm* — Invoke

(57) ABSTRACT

Techniques for determining one or more replication paths for resources in different failure domains, while maintaining a target resiliency level, are disclosed. A replication path is a sequence of at least a subset of the set of resources. Based on the sequence, a resource is selected for replicating at least a portion of the resource consumers corresponding to each of the subset of resources. A replication path may be determined by adding a resource to the replication path and/or replacing one resource with another resource to modify the replication path. The modified replication path maintains the target resiliency level if the modified replication path does not include any loop of a length less than or equal to the target resiliency level.

20 Claims, 12 Drawing Sheets

(56) References Cited

U.S. PATENT DOCUMENTS

| | | | |
|---|---|---|---|
| 9,588,855 B2 | 3/2017 | Joshi et al. | |
| 2010/0332991 A1* | 12/2010 | Banerjee | H04L 41/12 715/736 |
| 2012/0016840 A1 | 1/2012 | Lin et al. | |
| 2012/0151164 A1 | 6/2012 | Nayak | |
| 2012/0159234 A1 | 6/2012 | Mehta et al. | |
| 2015/0026517 A1 | 1/2015 | Ben et al. | |
| 2015/0100826 A1 | 4/2015 | Vujic et al. | |

OTHER PUBLICATIONS

Smith, Barbara M., "A Tutorial on Constraint Programming", University of Leeds, School of Computer Studies Research Report Series, Report 95.14, Apr. 1995, 22 pages.

Simalango et al., "Towards Constraint-based High Performance Cloud System in the Process of Cloud Computing Adoption in an Organization", Proceedings of 1st KIITA Conference on Smart Enterprise, Seoul, South Korea, Oct. 21, 2010, 11 pages.

Rappaport et al., "Update Aware Replica Placement", 9th International Conference on Network and Service Management (CNSM), Zurich, 2013, pp. 92-99.

Neves et al., "Optimization in Content Distribution Networks", EngOpt 2008—International Conference on Engineering Optimization, Rio de Janeiro, Brazil, Jun. 1-5, 2008, pp. 1-9.

Myint et al., "Improving Data Availability in Cloud Storage with Efficient Replication", In proceedings of the 10th International Conference on Computer Application (ICCA2012), Yangon, Myanmar, available online at <http://www.academia.edu/5171739/Improving_Data_Availability_in_Cloud_Storage_with_Efficient_Replication>, Feb. 2012, 6 pages.

Milano et al., "Constraint Programming", Contributi Scientifici, 2006, 6 pages.

McKeown et al., "Disaster Recovery and High Availability for Azure Applications", Microsoft, available online at <https://msdn.microsoft.com/en-us/library/azure/dn251004.aspx>, retrieved on Dec. 17, 2015, pp. 1-34.

Liang et al., "Delivering High Resilience in Designing Platform-as-a-Service Clouds", IEEE International Conference on Cloud Computing (CLOUD), 2011, available online at <http://ieeexplore.ieee.org/xpl/login.jsp?tp=&arnumber=6008770&url=http%3A%2F%2Fieeexplore.ieee.org%2Fxpls%2Fabs_all.jsp%3Farnumber%3D6008770>, retrieved on Dec. 17, 2015, 2 pages.

Jaffar et al., "Constraint Logic Programming: A Survey", The journal of logic programming, Elsevier, vol. 19, No. 20, 1994, pp. 503-581.

Google Cloud Platform, "Building Scalable and Resilient Web Applications on Google Cloud Platform", available online at <https://cloud.google.com/solutions/scalable-and-resilient-apps>, retrieved on Dec. 17, 2015, pp. 1-19.

Couto et al., "Network Design Requirements for Disaster Resilience in IaaS Clouds", IEEE Communications Magazine, Oct. 2014, pp. 1-11.

Chen et al., "Dynamic Replica Placement for Scalable Content Delivery", Peer-to-Peer Systems, vol. 2429 of the series Lecture Notes in Computer Science, 2002, pp. 306-318.

Bui et al., "Resilience Options for Provisioning Anycast Cloud Services with Virtual Optical Networks", IEEE International Conference on Communications (ICC), Jun. 10-14, 2014, pp. 3462-3468.

Biovin et al., "A Load Balancing Procedure for Parallel Constraint Programming", CIRRELT-2008-32, Jul. 2008, 28 pages.

* cited by examiner

US 10,664,359 B2

DETERMINING A REPLICATION PATH FOR RESOURCES OF DIFFERENT FAILURE DOMAINS

PRIORITY CLAIM; INCORPORATED BY REFERENCE

This application is a Continuation of U.S. application Ser. No. 15/003,495 entitled "DETERMINING A REPLICATION PATH FOR RESOURCES OF DIFFERENT FAILURE DOMAINS" filed on Jan. 21, 2016, the contents of which is incorporated herein by reference in its entirety.

RELATED APPLICATIONS; INCORPORATION BY REFERENCE

This application is related to U.S. Non-Provisional patent application Ser. No. 14/829,018, filed Aug. 28, 2015, which is hereby incorporated by reference.

TECHNICAL FIELD

The present disclosure relates to resources associated with different failure domains. In particular, the present disclosure relates to determining a replication path for resources associated with different failure domains.

BACKGROUND

In computer networks and cloud computing environments (also referred to herein as "computing environments"), a plurality of resource consumers share a plurality of resources. Examples of a resource consumer include one or more jobs, files, data caches, databases, sets of data, applications, and/or sets of operations. Examples of a resource include one or more processors, servers, data storages, virtual machines, and/or platforms.

The resources may be associated with different failure domains. A failure domain includes a particular set of resources that are affected by a single point of failure. If a problem occurs with the single point of failure, then each resource in the failure domain also fails.

One performance objective of a computing environment, including a set of resources, is to maintain a particular level of resiliency. Resiliency is the ability of the computing environment to maintain an acceptable level of service subsequent to one or more resource failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
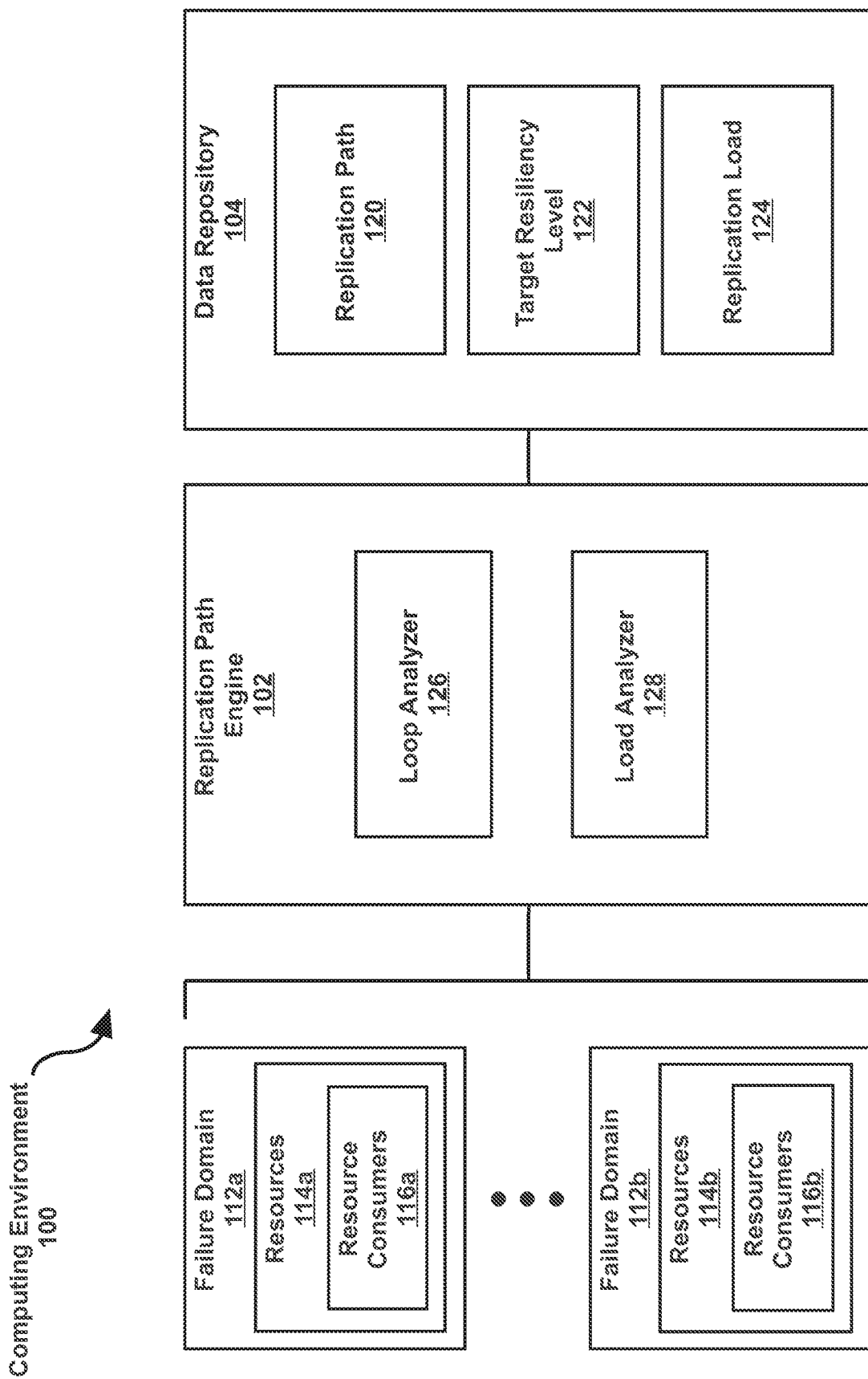
FIG. 1A illustrates a computing environment, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RESOURCE MANAGEMENT ARCHITECTURE
3. ADDING A RESOURCE TO A REPLICATION PATH
4. MODIFYING A REPLICATION PATH
5. EXAMPLE EMBODIMENTS
6. CLOUD ENVIRONMENTS
7. MISCELLANEOUS; EXTENSIONS
8. HARDWARE OVERVIEW

1. GENERAL OVERVIEW

Resource consumers (including replicas thereof) may be implemented across resources. Any particular resource may fail. A resource consumer remains accessible as long as the resource consumer (or a replica thereof) is implemented on at least one non-failed resource. Resources may be distributed across failure domains. When any particular failure domain fails, all of the resources within the particular failure domain fail.

A computing environment includes a set of failure domains. A resiliency level for the computing environment is a maximum number of failure domains that may fail while a resource consumer remains accessible. To achieve a particular target resiliency level, the resource consumer is implemented on resources across a number of failure domains that is at least one greater than the target resiliency level. As an example, to achieve a target resiliency level of three, a resource consumer is implemented on resources across at least four different failure domains. Accordingly, even if three of the four failure domains fail, the resource consumer is available on a resource in the fourth non-failed failure domain.

One or more embodiments include determining a replication path. A replication path includes an ordered sequence of resources. A resource consumer, implemented by any one resource in the sequence of resources, is replicated on one or more other resources according to the ordered sequence of resources identified by the replication path. As an example, a target resiliency level of one is to be achieved. To achieve the target resiliency level of one, a particular resource consumer is to be implemented on resources across at least two failure domains (two is greater than resiliency level of one). The particular resource consumer is implemented on a first resource in a first failure domain. The replication path identifies a second resource, in a second failure domain, for replicating at least a subset of resource consumers implemented on the first resource in the first failure domain. Based on the replication path, the second resource in the second failure domain is selected for replicating the particular resource consumer that is currently implemented on the first resource in the first failure domain.

In an embodiment, a replication path is determined by ordering resources into an ordered sequence. As an example, a new resource is added to an existing replication path currently terminating at a particular resource. Adding the new resource to the existing replication path includes adding a new portion to the replication path from the particular resource (previous termination point) to the new resource (new termination point). The replication path is modified from terminating at the particular resource to terminating at the new resource. In an embodiment, the new resource is added to the existing replication path responsive at least to determining that adding the new resource would not generate any loop on the replication path of a length that is less than or equal to the target resiliency level. A loop is a section of a replication path that begins and ends at resources in a same failure domain. A loop may begin and end at different resources in a same failure domain. A loop may begin and end at the same resource in a failure domain.

In an embodiment, a replication path is determined by modifying a previously existing replication path. The replication path is modified to generate a modified replication path if the modification does not result in any loop on the modified replication path of a length that is less than or equal to the target resiliency level. The replication path may be modified, for example, to load balance resources within a computing environment.

The replication path is modified by replacing an original resource in an existing replication path with a new resource. Consumer resources replicated by the original resource may split into at least two subsets. A first subset of consumer resources may be continued to be replicated by the original resource. A second subset of consumer resources may be replicated by the new resource subsequent to the modification. As an example, the replication path initially indicates that the original resource is to be used for replicating a resource consumer implemented by a particular resource. The replication path is modified to indicate that the new resource is be used for replicating the resource consumer implemented by the particular resource.

2. RESOURCE MANAGEMENT ARCHITECTURE

FIG. 1A illustrates a computing environment 100, in accordance with one or more embodiments. As illustrated in FIG. 1A, computing environment 100 includes replication path engine 102, data repository 104, and failure domains 112a-112b. Each failure domain includes one or more resources 114a-114b. Each resource implements a resource consumer 116a-116b.

Computing environment 100 may include more or fewer components than the components illustrated in FIG. 1A. The components illustrated in FIG. 1A may be local to or remote from each other. The components illustrated in FIG. 1A may be implemented in software and/or hardware and may be distributed over one or more applications and/or machines. Operations described with respect to one component may instead be performed by another component.

In one or more embodiments, a resource consumer (e.g., resource consumer 116a) includes one or more data objects and/or operations that demand the use of at least one resource (e.g., resource 114a). Examples of a resource consumer include one or more jobs, files, data caches, sets of data, applications, and/or sets of operations.

Each resource consumer may be associated with a primary instance and one or more backup instances. A primary instance of a particular resource consumer is a copy of the resource consumer that is primarily referenced by an application, a database, or a user.

A backup instance of a particular resource consumer may be referred to herein as a "replica" of the particular resource consumer. In the event that a primary instance of a resource consumer becomes inaccessible (for example, a failure occurs on a resource implementing the resource consumer), then a backup instance of the resource consumer may be used to replace the primary instance, and/or to restore the primary instance.

A backup instance of a resource consumer may be implemented in various ways. A backup instance of a resource consumer may store the same data as a primary instance of the resource consumer. Additionally or alternatively, a backup instance of a resource consumer may execute the same operations as a primary instance of the resource consumer. Further, a backup instance of a resource consumer may be copied from a primary instance of the resource consumer. Additionally or alternatively, a backup instance of a resource consumer may be copied from another backup instance of the resource consumer.

As an example, Resource A may implement a primary instance of Resource Consumer X. Resource B may implement a backup instance of Resource Consumer X. Resource C may implement a backup instance of Resource Consumer X by (a) copying Resource Consumer X from Resource A, and/or (b) copying Resource Consumer X from Resource B.

In one or more embodiments, a resource (e.g., resource 114a) is a physical and/or virtual component of a computing system. Examples of a resource include one or more processors, servers, data storages, virtual machines (VMs), and/or platforms. A resource is configured to execute requests demanded by one or more resource consumers. A resource may simultaneously implement a primary instance of a resource consumer and one or more backup instances of other resource consumers.

In a computer network or a cloud environment (also referred to herein as a "computing environment"), multiple resource consumers share a set of resources, which may geographically centralized or distributed. Resource consumers independently demand computing capabilities, such as server time and network storage, as needed. A primary instance of a resource consumer may be allocated to a particular resource. A backup instance of the resource consumer may be allocated to another resource(s) that is selected based on a replication path (120) discussed below. Additional embodiments and examples of cloud environments are described below in Section 6, titled "Cloud Environments."

In one or more embodiments, a resource is associated with a failure domain (e.g., failure domains 112a-112b). Examples of failure domains include, but are not limited to, (a) a computer which executes a resource, (b) a Local Area Network which implements a resource, and (c) a server rack which hosts a set of servers. A failure domain that includes a resource implementing an instance of a particular resource consumer is referred to herein as a "failure domain implementing the instance of the particular resource consumer."

If a failure domain fails, resources associated with the failure domain fail. Furthermore, when a resource fails, resource consumers implemented by the resource may fail. As an example, when a physical machine ("failure domain") fails due to power failure, virtual machines ("resources") executed by the physical machine fail. Furthermore, data ("resource consumers") maintained by the virtual machine may be lost.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as replication path engine 102. Alternatively or additionally, data repository 104 may be implemented or executed on a separate computing system than replication path engine 102. Data repository 104 may be communicatively coupled to replication path engine 102 via a direct connection or via a network.

Information describing target resiliency level 122, replication path 120, and replication load 124 may be implemented across any of components within computing environment 100. However, this information is illustrated within data repository 104 for purposes of clarity and explanation. Information describing failure domains 112a-112b, resources 114a-114b, and resource consumers 116a-116b may be implemented within a same data repository 104 and/or one or more different data repositories.

As noted above, a computing environment includes a set of failure domains. A target resiliency level 122 for the computing environment refers to a maximum number of failure domains that may fail while a resource consumer remains accessible. To achieve a particular target resiliency level (e.g., target resiliency level 122), the resource consumer is implemented on resources across a number of failure domains that is at least one greater than the target resiliency level. As an example, to achieve a target resiliency level of three, a resource consumer is implemented on resources across at least four different failure domains. Accordingly, even if three of the four failure domains fail, the resource consumer is available on a resource in the fourth non-failed failure domain.

A resource "RS1" within a failure domain "DM1" is referred to herein as "DM1:RS1". As an example, a set of resources may include DM1:VM1, DM2:VM1, and DM3:VM1. DM1:VM1 may implement a primary instance of Resource Consumer X, DM2:VM1 may implement a primary instance of Resource Consumer Y, and DM3:VM1 may implement a primary instance of Resource Consumer Z. Further, DM1:VM1 may implement backup instances of Resource Consumers Y and Resource Consumers Z, DM2: VM1 may implement backup instances of Resource Consumers X and Resource Consumers Z, and DM3:VM1 may implement backup instances of Resource Consumers X and Resource Consumers Y. Hence, the number of failure domains that implement an instance of Resource Consumer X is three (DM1, DM2, and DM3). The number of failure domains that implement an instance of Resource Consumer Y is three (DM1, DM2, and DM3). The number of failure domains that implement an instance of Resource Consumer Z is three (DM1, DM2, and DM3).

Continuing the example, DM2 and DM3 may fail at the same time. The primary instances of Resource Consumers Y and Resource Consumers Z, implemented respectively by DM2:VM1 and DM3:VM1, may become inaccessible. However, backup instances of Resource Consumers Y and Resource Consumers Z would remain implemented on DM1:VM1, since DM1 has not failed. Resource Consumers Y and Resource Consumers Z would remain accessible from DM1:VM1. By having at least three failure domains implement an instance of each resource consumer, the set of resources remains accessible subsequent to two simultaneous resource failures. Accordingly, a target resiliency level of two is achieved.

In an embodiment, a replication path 120 includes an ordered sequence of resources. The sequence of resources is directional. The sequence Resource A→Resource B is different from the sequence Resource B→Resource A. Given a particular replication path 120 Resource A→Resource B, Resource B is referred to herein as "directly following" Resource A on the replication path, and Resource A is referred to as "directly preceding" Resource B on the replication path.

A replication path 120 indicates how replicas of resource consumers are to be allocated across a set of resources. Replicas of a particular resource consumer implemented by a particular resource are to be allocated to resources following the particular resource on a replication path 120, based on whether a target resiliency level 122 has been achieved. The following example demonstrates how replication occurs given a particular replication path and a particular target resiliency level.

Figure 1B:
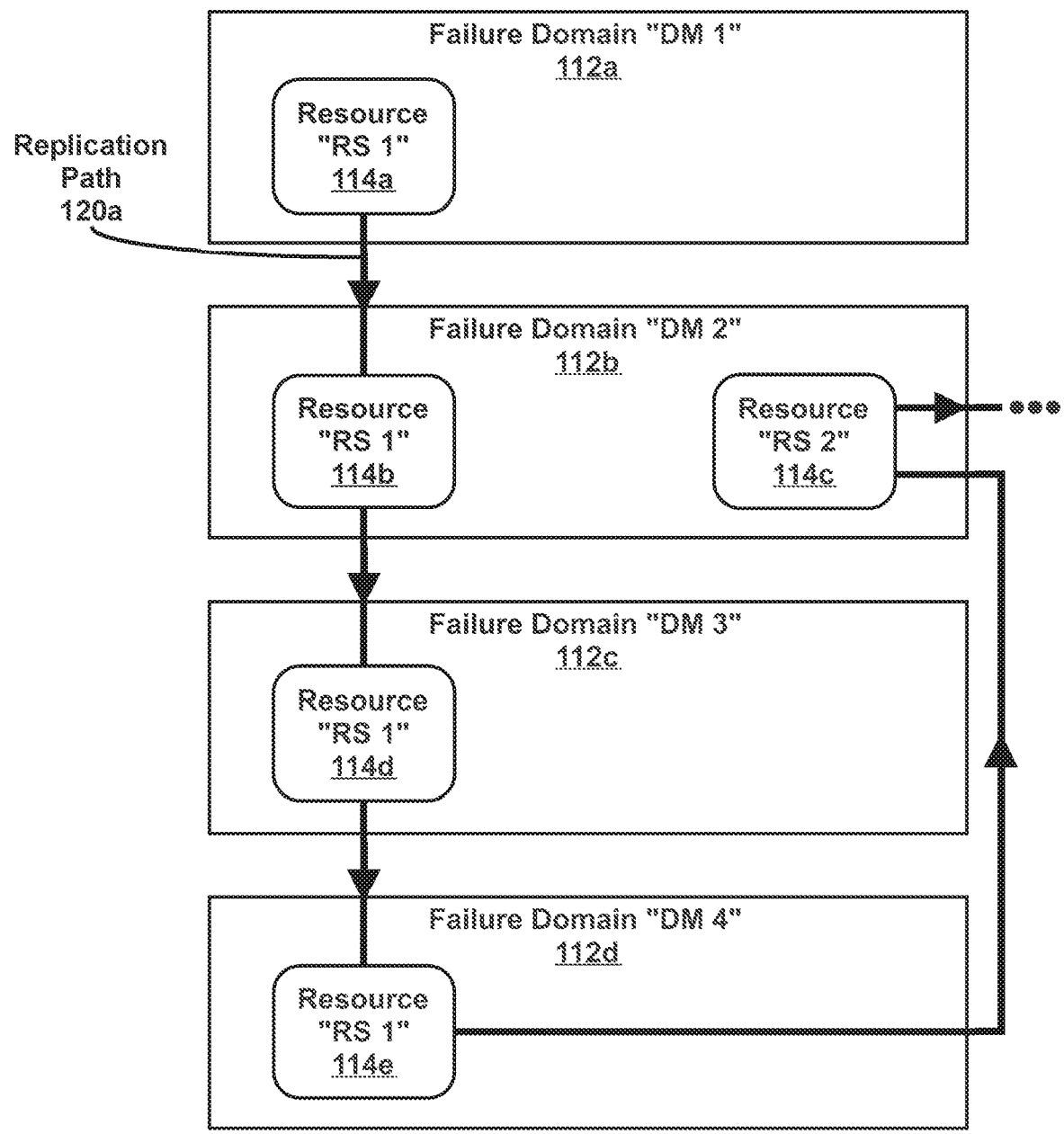
FIGS. 1B-1C illustrate examples of replication paths, in accordance with one or more embodiments.

FIG. 1B illustrates an example of a replication path 120a. Replication path 120a includes resource 114a in failure domain 112a ("DM1:RS1"), resource 114b in failure domain 112b ("DM2:RS1"), resource 114c in failure domain 112b ("DM2:RS2"), resource 114d in failure domain 112c ("DM3:RS1"), and resource 114e in failure domain 112d ("DM4:RS1"). Replication path 120a may be expressed herein in textual form as DM1:RS1→DM2:RS1→DM3:RS1→DM4:RS1→DM2:RS2. Additional resources of additional failure domains may be included in the replication path 120a but are not illustrated. In this example, a target resiliency level may be set to two.

Continuing the example, DM1:RS1 may implement a primary instance of Resource Consumer X. Each resource following DM1:RS1 on replication path 120a replicates Resource Consumer X, if the target resiliency level has not yet been achieved. An inquiry may be made to determine whether DM2:RS1 is to replicate Resource Consumer X. Since a number of replicas of Resource Consumer X is zero, the target resiliency level has not been achieved. Hence, DM2:RS1 would replicate Resource Consumer X. Similarly, an inquiry may be made to determine whether DM3:RS1 is to replicate Resource Consumer X. The number of replicas of Resource Consumer X is now one, which is still less than the target resiliency level. Hence, DM3:RS1 would replicate Resource Consumer X.

Similarly, an inquiry may be made to determine whether DM4:RS1 is to replicate Resource Consumer X. Since the number of replicas of Resource Consumer X is now two, the target resiliency level has been achieved. Hence, no additional replicas of Resource Consumer X is necessary. Neither DM4:RS1 nor DM2:RS2 would replicate Resource Consumer X.

A replication path 120 may include multiple sequences. Multiple sequences may converge to a same particular resource. As an example, a first resource in a first sequence may be directly followed by a particular resource. Furthermore, a second resource in a second sequence may be directly followed by the same particular resource. The particular resource is referred to herein as a "converging resource." The converging resource may replicate each resource consumer that is implemented by other resources (in one or more sequences) directly preceding the converging resource.

As an example, a replication path 120 may include two sequences of resources: (1) Resource A→Resource B, and Resource C→Resource B. Since Resource B is preceded by a different resource in each sequence, Resource B would be a "converging resource." Resource A may implement a primary instance of Resource Consumer X, and Resource C may implement a primary instance of Resource Consumer Y. Based on the replication path 120, Resource B would be used to implement a backup instance of each of Resource Consumer X and Resource Consumer Y.

A replication path 120 includes one or more hops. A hop is a connection from one resource to another resource on the replication path 120. As an example, a replication path Resource A→Resource B includes one hop. Another replication path Resource C→Resource D→Resource E includes two hops.

A replication path 120 may include zero, one, or more loops. A loop is a section of the replication path 120 that begins at a resource 114*a* of a particular failure domain 112*a* and ends at a same or different resource of the same particular failure domain 112*a*. Referring to FIG. 1B, as an example, replication path 120*a* comprises DM1:RS1→DM2:RS1→DM3:RS1→DM4:RS1→DM2:RS2. Looking only at the failure domains, the sequence of failure domains is DM1→DM2→DM3→DM4→DM2. A section of replication path 120*a* begins at DM2 and ends at DM2, which forms a loop. The loop corresponds to the section DM2:RS1→DM3:RS1→DM4:RS1→DM2:RS2.

A length of a loop is a number of hops, on the replication path, starting at a resource of a particular failure domain to a same or different resource of the same particular failure domain. Referring to FIG. 1B again, as described above, a loop on replication path 120*a* comprises DM2:RS1→DM3:RS1→DM4:RS1→DM2:RS2. One hop is DM2:RS1→DM3:RS1. Another hop is DM3:RS1→DM4:RS1. Another hop is DM4:RS1→DM2:RS2. The number of hops is three. Therefore, the length of the loop is three.

Additionally or alternatively, a length of a loop is a number of distinct failure domains included in the loop. Counting a number of distinct failure domains means that a particular failure domain that is repeated on the loop is not counted more than once. Referring to FIG. 1B again, as described above, a loop on replication path 120*a* comprises DM2:RS1→DM3:RS1→DM4:RS1→DM2:RS2. Distinct failure domains included in the loop are DM2, DM3, and DM4. Since there are three distinct failure domains, the length of the loop is three.

A particular target resiliency level 122 is achieved if a length of any loop on a replication path 120 is greater than the particular target resiliency level 122. Given a replication path 120 indicating a particular sequence, there is no subsequence of a length less than the target resiliency level 122 that commences and ends at a same failure domain. The following examples demonstrate how a target resiliency level is achieved based on a length of any loop on a replication path.

In one example, a replication path having a loop of a length equal to the target resiliency level would not achieve the target resiliency level. Referring to FIG. 1B, as described above, replication path 120*a* comprises DM1:RS1→DM2:RS1→DM3:RS1→DM4:RS1→DM2:RS2. A loop on replication path 120*a* comprises DM2:RS1→DM3:RS1→DM4:RS1→DM2:RS2. The length of the loop is three. Additional resources of additional failure domains may be included in the replication path 120*a* but are not illustrated. In this example, a target resiliency level that is desired to be achieved is three.

Continuing the example, DM2:RS1 may implement a primary instance of Resource Consumer X. Based on the replication path 120*a* and the target resiliency level of three, the resources that implement replicas of Resource Consumer X may be determined. Initially, the number of replicas of Resource Consumer X is zero. The resource directly following DM2:RS1, which is DM3:RS1, would replicate Resource Consumer X. The number of replicas of Resource Consumer X is now one, which is less than the target resiliency level. The resource directly following DM3:RS1, which is DM4:RS1, would replicate Resource Consumer X. The number of replicas of Resource Consumer X is now two, which is less than the target resiliency level. The resource directly following DM4:RS1, which is DM2:RS2, would replicate Resource Consumer X. In summary, each of DM3:RS1, DM4:RS1, and DM2:RS2 would implement a replica of Resource Consumer X.

According to this example, DM2 would implement a primary instance and a backup instance of Resource Consumer X. DM3 would implement a backup instance of Resource Consumer X. DM4 would implement a backup instance of Resource Consumer X. The number of failure domains implementing instances of Resource Consumers X would be 3 (DM2, DM3, DM4). However, as described above, the number of failure domains implementing instances of Resource Consumers X must be greater than three in order to achieve the target resiliency level of three. Therefore replication path 120*a*, which includes a loop having a length equal to the target resiliency level of three, does not achieve the target resiliency level of three.

Figure 1C:
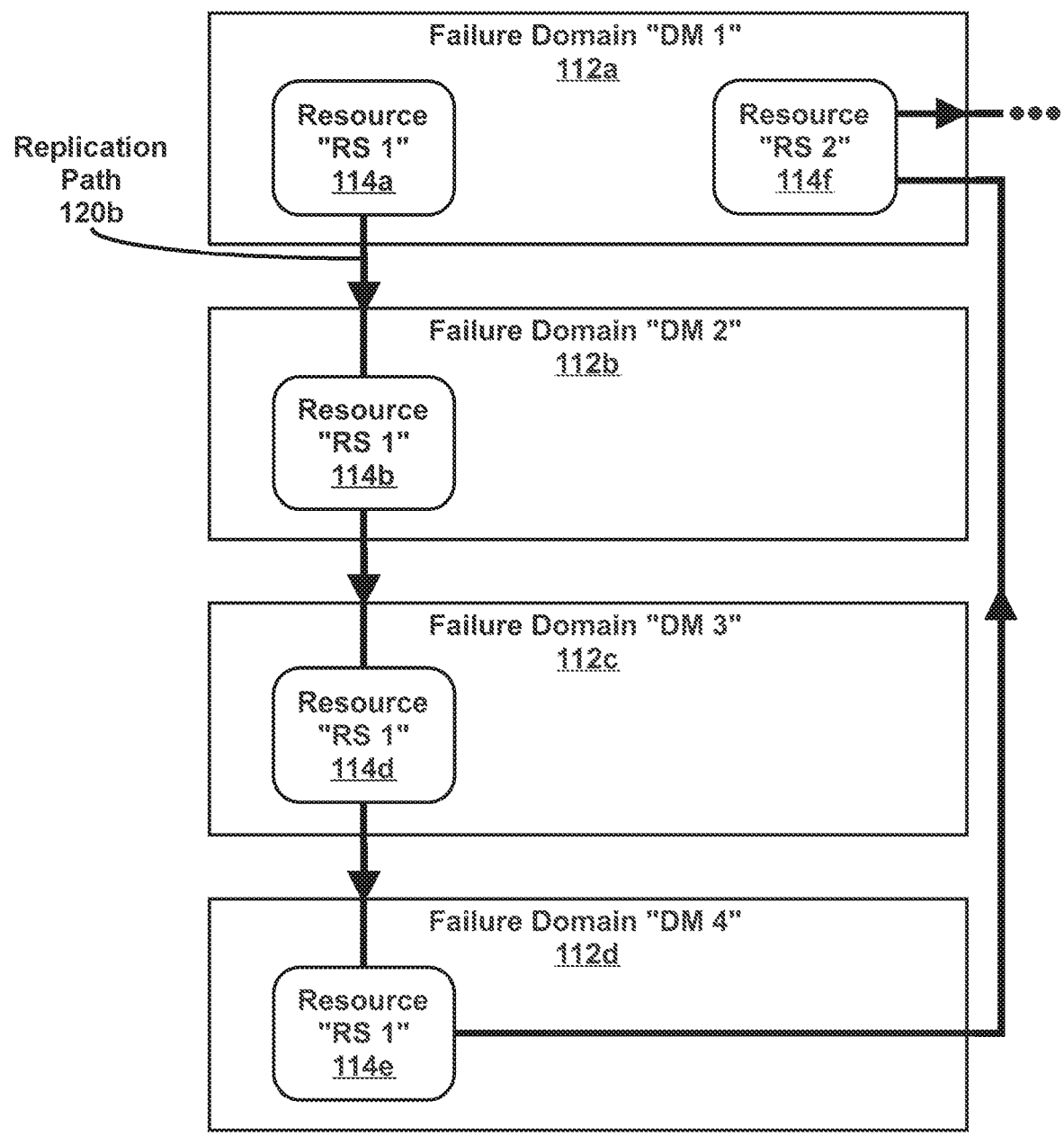

FIG. 1C illustrates another example of a replication path 120*b*. Replication path 120*b* includes resource 114*a* in failure domain 112*a* ("DM1:RS1"), resource 114*f* in failure domain 112*a* ("DM1:RS2"), resource 114*b* in failure domain 112*b* ("DM2:RS1"), resource 114*d* in failure domain 112*c* ("DM3:RS1"), and resource 114*e* in failure domain 112*d* ("DM4:RS1").

Replication path 120*b* comprises DM1:RS1→DM2:RS1→DM3:RS1→DM4:RS1→DM1:RS2. A loop on replication path 120*b* comprises DM1:RS1→DM2:RS1→DM3:RS1→DM4:RS1→DM1:RS2, which is a section of replication path 120*b* that begins and ends at DM1. The length of the loop is four. Additional resources of additional failure domains may be included in the replication path 120*b* but are not illustrated. A target resiliency level may be set to three.

Continuing the example, DM1:RS1 may implement a primary instance of Resource Consumer Y. Based on the replication path 120*b* and the target resiliency level of three, the resources that implement replicas of Resource Consumer Y may be determined. A number of hops between DM1:RS1 and DM2:RS1 is 1. A number of hops between DM1:RS1 and DM3:RS1 is two. A number of hops between DM1:RS1 and DM4:RS1 is three. A number of hops between DM1:RS1 and DM1:RS2 is four. Since the number of hops from DM1:RS1 to each of DM2:RS1, DM3:RS1, and DM4:RS1 is less than or equal to the target resiliency level of three, each of DM2:RS1, DM3:RS1, and DM4:RS1 would implement a replica of Resource Consumer Y. However, since the number of hops from DM1:RS1 to DM1:RS2 is four, which is greater than the target resiliency level of three, DM1:RS2 would not implement a replica of Resource Consumer Y.

According to this example, DM1 would implement a primary instance of Resource Consumer Y. DM2 would implement a backup instance of Resource Consumer Y. DM3 would implement a backup instance of Resource Consumer Y. DM4 would implement a backup instance of Resource Consumer Y. The number of failure domains implementing instances of Resource Consumers Y would be four (DM1, DM2, DM3, DM4), which is greater than the target resiliency level of three. Therefore replication path 120b, which includes a loop having a length greater than the target resiliency level of three, achieves the target resiliency level of three.

In one or more embodiments, a replication load 124 of a particular resource 114a refers to a number of resources that directly precede the particular resource on one or more replication paths. As an example, a replication path may indicate Resource A→Resource C. Another replication path may indicate Resource B→Resource C. Two resources directly precede Resource C on one or more replication paths. Therefore, a replication load of Resource C would be two.

In one or more embodiments, replication path engine 102 refers to hardware and/or software configured to perform operations described herein for determining one or more replication paths 120 in order to achieve a target resiliency level 122. Examples of operations for determining one or more replication paths 120 to achieve a target resiliency level 122 are described below with reference to FIGS. 2-4.

A loop analyzer 126 and a load analyzer 128 may be implemented within replication path engine 102, or may be implemented as separate components from replication path engine 102. Loop analyzer 126 is configured to perform operations described herein for determining a replication path 120 based on loops (if any) 120 on the replication path 120. Examples of operations for determining a replication path 120 based on loops (if any) 120 on the replication path 120 are described below with reference to at least FIGS. 2-4. Load analyzer 128 is configured to perform operations described herein for determining a replication path 120 based on one or more replication loads 124. Examples of operations for determining a replication path 120 based on one or more replication loads 124 are described below with reference to at least FIG. 4.

In an embodiment, replication path engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

3. ADDING A RESOURCE TO A REPLICATION PATH

Figure 2:
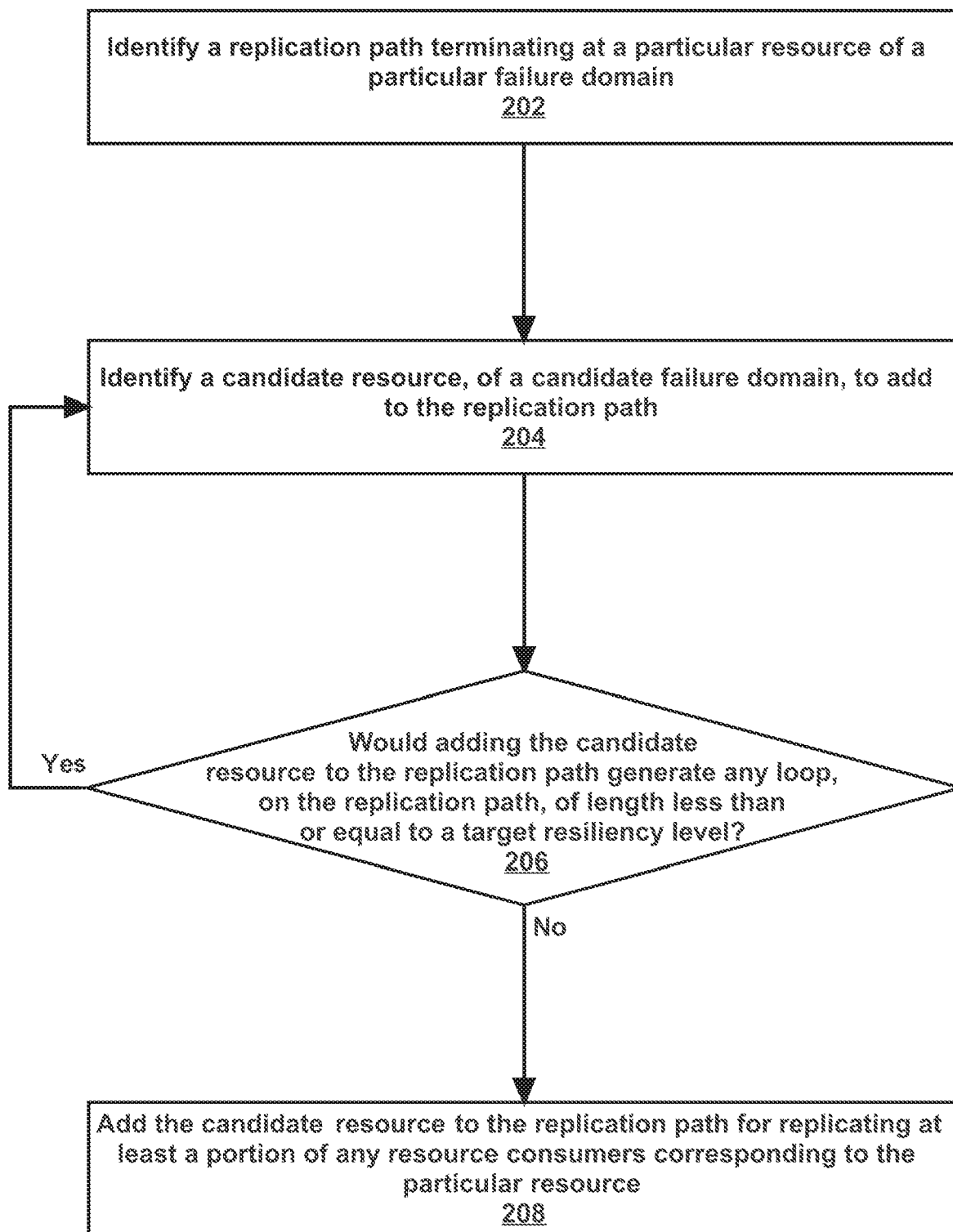
FIG. 2 illustrates an example set of operations for adding a candidate resource to a replication path for replicating at least a portion of any resource consumers corresponding to a particular resource, in accordance with one or more embodiments.

FIG. 2 illustrates an example set of operations for adding a resource to a replication path in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include identifying a replication path terminating at a particular resource of a particular failure domain (Operation 202). The particular resource is one of a set of resources implementing a set of resource consumers. A replication path terminates at the particular resource if the replication path does not identify resources for replicating resource consumers implemented by the particular resource. As an example, a replication path may be Resource A→Resource B. The replication path identifies Resource B for replicating one or more resource consumers implemented by Resource A. However, the replication path does not identify resources for replicating resource consumers implemented by Resource B. The replication path terminates at Resource B.

A replication path engine may identify an aggregated replication path by aggregating a plurality of replication paths that terminate at a particular resource ("current termination point"). As an example, a replication path may be Resource A→Resource B. Another replication path may be Resource C→Resource B. An aggregated replication path may include two sequences of resources: (1) Resource A→Resource B, and (2) Resource C→Resource B. None of the sequences identify resources for replicating resource consumers implemented by Resource B. The aggregated replication path would terminate at Resource B.

One or more embodiments include identifying a candidate resource, of a candidate failure domain, to add to the replication path (Operation 204). Adding the candidate resource to the existing replication path would include adding a new portion to the replication path from the particular resource (current termination point) to the candidate resource (new termination point). The replication path would be modified from terminating at the particular resource to terminating at the candidate resource. The candidate resource may be the same as or different from any resources already on the replication path. The replication path engine may identify a candidate resource based on one or more criteria, examples of which are described below.

The replication path engine may identify a candidate resource that is in a different failure domain than the particular resource ("current termination point"). Additionally or alternatively, the replication path engine may identify a candidate resource based on a physical distance between (a) a physical machine executing the particular resource and (b) a physical machine executing the candidate resource. As an example, a replication path engine may determine the physical distances between (a) a physical machine executing the particular resource and (b) a physical machine executing each of a set of resources. The replication path engine may then identify a candidate resource as a resource having the closest physical distance to the physical machine executing the particular resource.

In an embodiment, identifying the candidate resource comprises identifying a candidate failure domain that would later execute the candidate resource. The candidate resource may be a candidate VM. The candidate VM may not yet be spun up or executed at the time of the determination of the replication path. However, the candidate VM may be later executed in the identified candidate failure domain.

One or more embodiments include inquiring whether adding the candidate resource to the replication path would create any loop, on the replication path, of length less than or equal to a target resiliency level (Operation 206). The replication path engine may retrieve the target resiliency level from a data repository. The target resiliency level may have been set based on user input. Whether any loop, on the replication path, of length less than or equal to the target resiliency level would be generated may be determined based on a number of hops and/or a number of distinct failure domains, which are described below.

A. Determining a Length of a Loop Based on a Number of Hops

Figure 3:
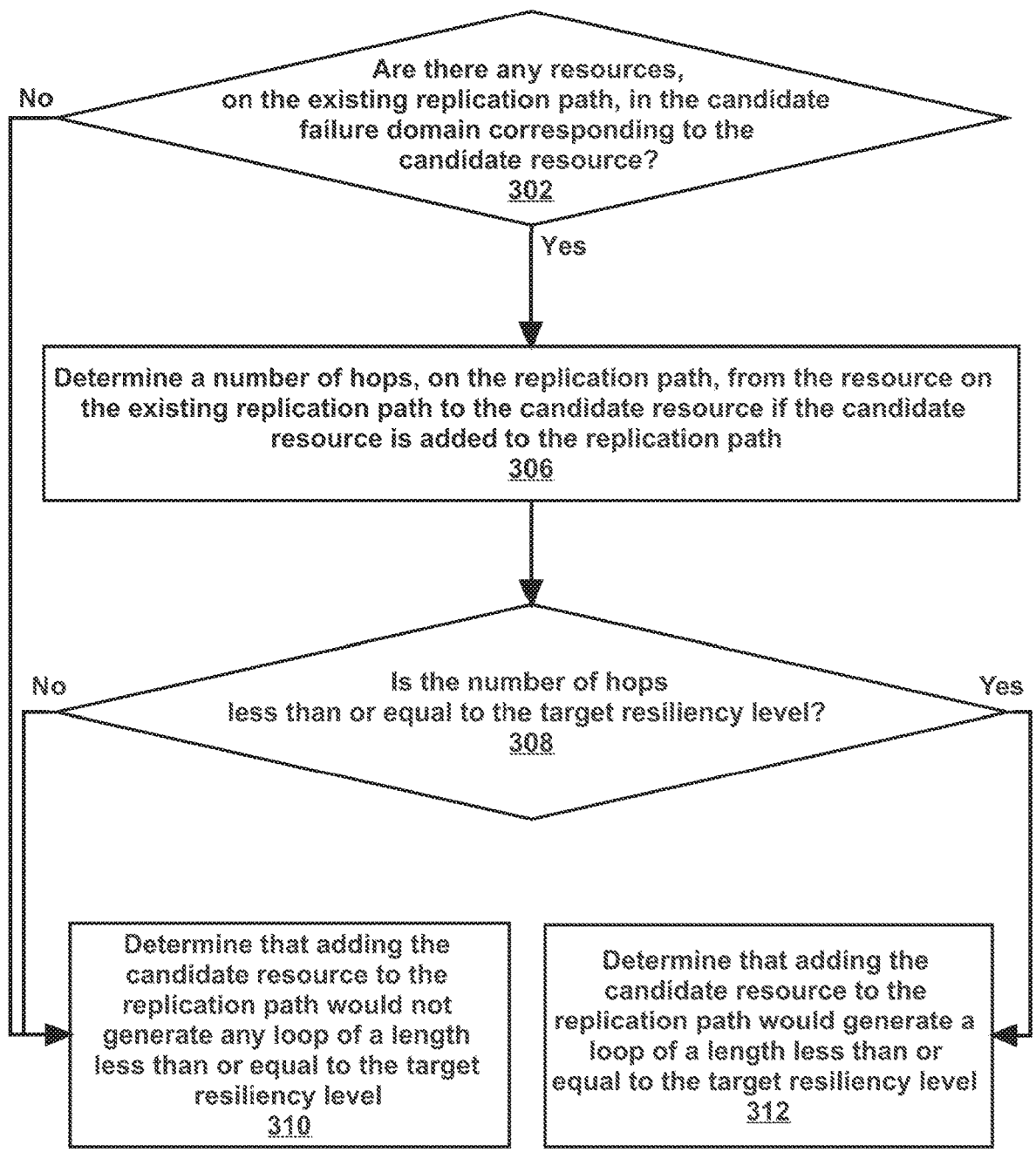
FIG. 3 illustrates an example set of operations for determining whether any loop of a length less than or equal to a target resiliency level is generated on a replication path, in accordance with one or more embodiments.

FIG. 3 illustrates an example set of operations for determining whether adding a candidate resource to an existing replication path would generate a loop, on the replication path, of a length less than or equal to a target resiliency level. One or more operations illustrated in FIG. 3 may be performed by a loop analyzer and/or another component of the replication path engine. Further, one or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include inquiring whether any resources, on the existing replication path, are in the candidate failure domain corresponding to the candidate resource (Operation 302). The loop analyzer (and/or the replication path engine) identifies each resource that is already on the replication path. The loop analyzer identifies the failure domains corresponding to each identified resource. The replication path compares the failure domains, corresponding to each identified resource, with the candidate failure domain of the candidate resource. If there is a match, then at least one resource, on the existing replication path, is in the candidate failure domain of the candidate resource.

If there is no match, then no resources, already on the replication path, are in the candidate failure domain of the candidate resource. The loop analyzer determines that adding the candidate resource to the replication path would not generate any loop of a length less than or equal to the target resiliency level (Operation 310).

The following example demonstrates that no loop is generated if no resources, on the existing replication path, are in the candidate failure domain. An existing replication path may include DM1:RS1→DM2:RS1. A candidate resource may be DM3:RS1. An inquiry may be made to determine whether any resources, already on the replication path, are in the candidate failure domain DM3. The resources already on the replication path are in the failure domains DM1 and DM2, but are not in the candidate failure domain DM3. Accordingly, no resources, on the existing replication path, are in the candidate failure domain.

In an embodiment, a resource, on the existing replication path, is in the candidate failure domain corresponding to the candidate resource. As an example, a replication path may be DM1:RS1→DM2:RS1→DM3:RS1. A candidate resource may be DM1:RS2. A failure domain already included on the replication path would be DM1, which is the same as the candidate failure domain DM1. The corresponding resource in DM1 that is on the existing replication path is DM1:RS1.

One or more embodiments include determining a number of hops, on the replication path, from a resource on the existing replication path to the candidate resource if the candidate resource is added to the replication path (Operation 306). If more than one resource, on the existing replication path, are found in the candidate failure domain, then the resource (on the existing replication path) closest to the termination point of the existing replication path is used for determining the number of hops.

A number of hops is computed as one plus the number of intermediate resources between (a) the resource on the existing replication path and (b) the candidate resource. As an example, if there is one intermediate resource between the resource on the existing replication path and the candidate resource, then the number of hops is two. As another example, if there are three intermediate resources between the resource on the existing replication path and the candidate resource, then the number of hops is four. The number of hops corresponds to the length of the loop that would be generated by adding the candidate resource to the replication path.

One or more embodiments include inquiring whether the number of hops is less than or equal to the target resiliency level (Operation 308). If the number of hops is not less than or equal to the target resiliency level, then the loop analyzer determines that adding the candidate resource to the replication path would not generate any loop of a length less than or equal to the target resiliency level (Operation 310). If the number of hops is less than or equal to the target resiliency level, then the loop analyzer determines that adding the candidate resource to the replication path would generate a loop of a length less than or equal to the target resiliency level (Operation 312).

B. Determining a Length of a Loop Based on a Number of Failure Domains

As described, a length of a loop may be determined based on a number of hops between a resource (in the candidate failure domain), on the existing replication path, and the candidate resource in the candidate failure domain.

In an embodiment, a loop analyzer may determine a length of the loop based on a number of distinct failure domains associated with the loop. Similar to the above described operations, the loop analyzer identifies a set of one or more resources, on the existing replication path, that are in the candidate failure domain. From the identified set of resources, the resource that is closest to the current termination point of the existing replication path is identified for determining the length of the loop. The length of the loop is determined as the number of distinct failure domains in a portion of the replication path commencing from the resource, on the existing replication path, and ending at the candidate failure domain.

As an example, a candidate resource may be DM1:RS2. An existing replication path includes DM1:RS1→DM2:RS1→DM3:RS1. A modified replication path that would be generated if a candidate resource were added, to the existing replication path, may be DM1:RS1→DM2:RS1→DM3:RS1→DM1:RS2. DM1:RS1 is a resource on the existing replication path that is in the candidate failure domain DM1. A section of the replication path commencing at the resource, on the existing replication path, and terminating at the candidate resource would be DM1:RS1→DM2:RS1→DM3:RS1→DM1:RS2. The failure domains of each resource on the section is DM1, DM2, DM3, and DM1. A loop analyzer discards the duplicate instance of DM1 in the set of failure domains. The remaining failure domains are DM1, DM2, and DM3. Therefore, the number of distinct failure domains is three. The length of the loop is determined to be three.

If the number of distinct failure domains is not less than or equal to the target resiliency level, then the loop analyzer determines that adding the candidate resource to the replication path would not generate any loop of a length less than or equal to the target resiliency level. If the number of distinct failure domains is less than or equal to the target resiliency level, then the loop analyzer determines that adding the candidate resource to the replication path would generate a loop of a length less than or equal to the target resiliency level.

Returning to FIG. 2, if adding the candidate resource to the replication path would not generate any loop of a length less than or equal to the target resiliency level, then the replication path engine adds the candidate resource to the existing replication path. Adding the candidate resource to the existing replication path selects the candidate resource for replicating at least a portion of any resource consumers implemented by the particular resource corresponding to the current termination point (Operation 208).

The candidate resource is added as a last resource in each sequence of resources specified by the replication path. As an example, a replication path may specify two sequences of resources: (1) DM1:RS1→DM2:RS1, and (2) DM3:RS1→DM2:RS1. A candidate resource to be added to the replication path may be DM3:RS1. Adding the candidate resource to the replication path would generate the following sequences: (1) DM1:RS1→DM2:RS1→DM3:RS1, and (2) DM3:RS1→DM2:RS1→DM3:RS1.

As noted above, the added candidate resource is selected for replicating at least a portion of any resource consumers corresponding to the particular resource. As an example, a replication path may be DM1:RS1→DM2:RS1→DM3:RS1→DM4:RS1. A candidate resource may be DM1:RS1. A target resiliency level may be 2. DM1:RS1 may implement a primary instance of Resource Consumer A. DM2:RS1 may implement a primary instance of Resource Consumer B. DM3:RS1 may implement a primary instance of Resource Consumer C. DM4:RS1 may implement a primary instance of Resource Consumer D.

Continuing the example, since a number of hops from each of DM2:RS1 and DM3:RS1 to DM4:RS1 is less than or equal to the target resiliency level of two, DM4:RS1 would implement backup instances of Resource Consumer B and Resource Consumer C. However, since a number of hops from DM1:RS1 to DM4:RS1 is greater than the target resiliency level of two, DM4:RS1 would not implement a backup instance of Resource Consumer A. Hence, resource consumers corresponding to DM4:RS1 would be: Resource Consumer B (a backup instance), Resource Consumer C (a backup instance), and Resource Consumer D (a primary instance).

Continuing the example, since a number of hops from each of DM3:RS1 and DM4:RS1 to the candidate resource DM1:RS1 is less than or equal to the target resiliency level of two, DM1:RS1 would implement backup instances of Resource Consumer C and Resource Consumer D. However, since a number of hops from DM3:RS1 to the candidate resource DM1:RS1 is greater than the target resiliency level of two, DM1:RS1 would not implement a backup instance of Resource Consumer B. Hence, the candidate resource DM1:RS1 would replicate a portion of the resource consumers corresponding to DM4:RS1. The candidate resource DM1:RS1 would replicate only Resource Consumer C and Resource Consumer D. The candidate resource DM1:RS1 would not replicate Resource Consumer B.

If adding the candidate resource to the replication path would generate a loop of a length less than or equal to the target resiliency level, then the replication path engine reiterates the process using a different candidate resource. The process may reiterate until the replication path engine finds a candidate resource that would not generate any loop, on the replication path, of a length less than or equal to the target resiliency level.

4. MODIFYING A REPLICATION PATH

In an embodiment, a replication path may be modified. The replication path may be modified, for example, for load balancing, for re-allocating replicas after a resource has failed, for re-allocating replicas after a resource has been added or removed, or other purposes. The set of operations for modifying the replication path may be iteratively performed until a stop condition is satisfied.

As an example, a stop condition may require that the deviation across replication loads of a set of resources is below a specified threshold. The deviation may be, for example, a standard deviation, a mean absolute deviation, or a median absolute deviation. A deviation of zero indicates that the replication loads are balanced across the set of resources. If the deviation is below the specified threshold, then a desired level of load balancing may be achieved. Further modification to the replication path is not necessary.

As another example, a stop condition may require that a replication load of each of a set of resources is below a specified threshold. If the replication loads are below the specified threshold, then a desired level of load balancing may be achieved. Further modification to the replication path is not necessary.

As another example, a stop condition may simply specify a number of iterations to be performed during each period of time. As an example, the iteration may be performed once each minute.

Figure 4:
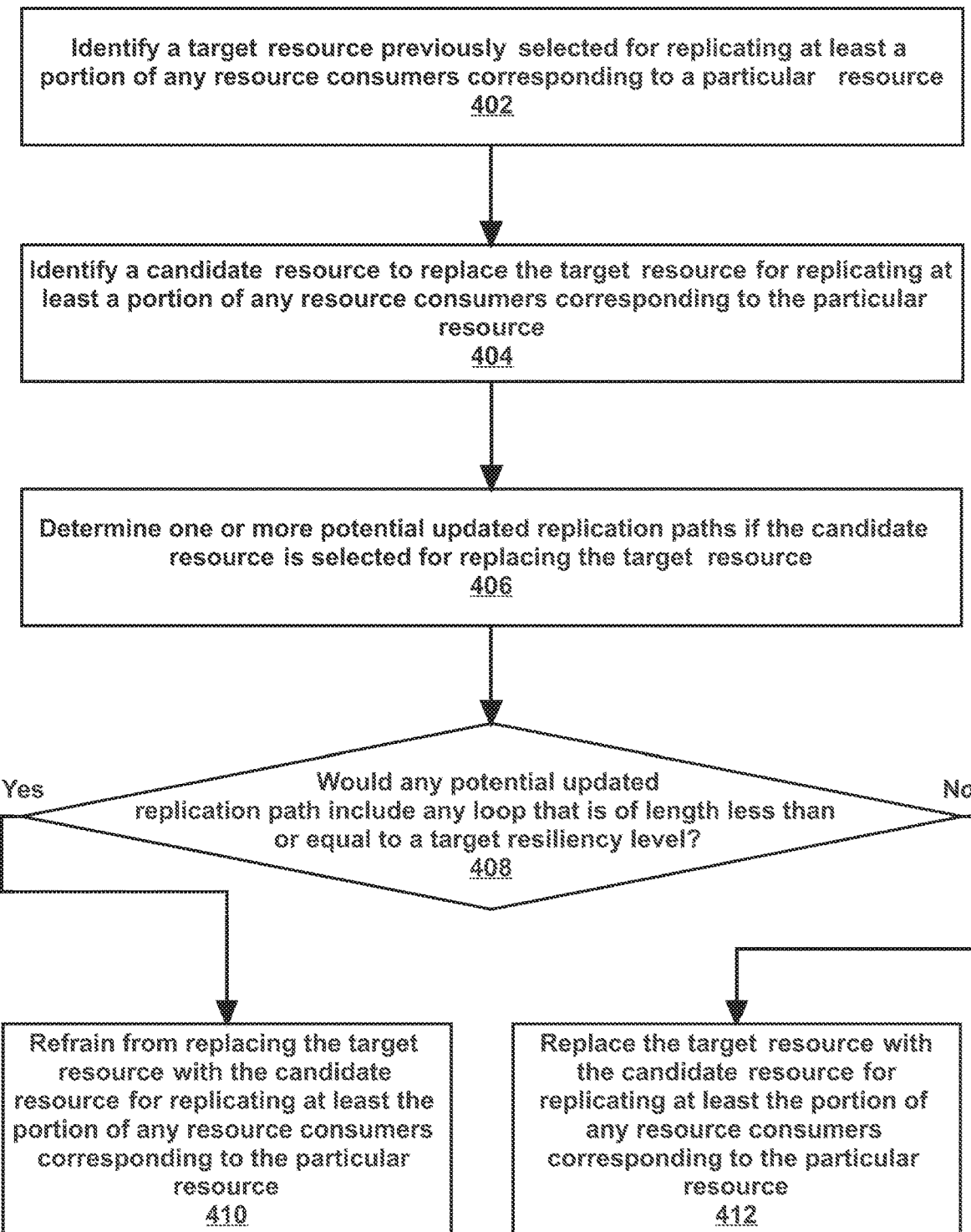
FIG. 4 illustrates an example set of operations for replacing a target resource with a candidate resource for replicating at least a portion of any resource consumers corresponding to a particular resource, in accordance with one or more embodiments.

FIG. 4 illustrates a set of operations for modifying a replication path. One or more operations illustrated in FIG. 4 may be performed by a loop analyzer, a load analyzer, and/or another component of the replication path engine. Further, one or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include identifying a target resource selected for replicating at least a portion of any resource consumers corresponding to a particular resource (Operation 402). At least a portion of the load at a target resource is to be redistributed to another resource. The load at the target resource may be computed as a function of resource consumers (including replicas) that are implemented by the target resource.

The load analyzer (and/or the replication path engine) may identify a target resource, from a set of resources, based on respective replication loads of the set of resources. As an example, the load analyzer identifies the resource with the highest replication load as the target resource. Alternatively, the load analyzer identifies a resource with a replication load that is above a specified threshold as the target resource.

One or more embodiments include identifying a candidate resource to replace the target resource for replicating at least a portion of any resource consumers corresponding to a particular resource (Operation 404). The load analyzer (and/ or the replication path engine) may identify a candidate resource based on the respective replication loads of a set of resources. As an example, the load analyzer identifies the resource with the lowest replication load as the candidate resource. Alternatively, the load analyzer identifies a resource with a replication load that is below a specified threshold as the candidate resource. Alternatively, the load analyzer identifies a resource with a replication load that is lower than the replication load of the target resource as the candidate resource.

The replication path engine may identify a candidate resource based on a physical distance between (a) a physical machine executing the particular resource and (b) a physical machine executing the candidate resource. The replication path engine identifies the resource associated with a closest physical distance to the physical machine executing the particular resource as the candidate resource.

In an embodiment, the load analyzer identifies a candidate resource first based on replication loads of a set of resources, and then by a physical distance between (a) a physical machine executing the particular resource and (b) a physical machine executing the candidate resource. The load analyzer identifies a resource with the lowest replication load from the set of resources. If more than one resource has the same lowest identified replication load, then the load analyzer identifies a resource with the closest physical distance from the resources having the lowest replication load. The load analyzer identifies the resource with both the lowest replication load and the closest distance as the candidate resource.

One or more embodiments include determining one or more potential updated replication paths if the candidate resource is selected for replacing the target resource for replicating at least a portion of any resource consumers corresponding to the one or more particular resources (Operation 406). A replication path engine identifies one or more resources directly preceding the target resource on any replication path. One potential updated replication path corresponds to each resource directly preceding the target resource on any replication path.

To determine one potential updated replication path, the replication path engine selects a particular resource from the resources directly preceding the target resource on any replication path. The replication path engine identifies a replication path including the target resource and the particular resource. The replication path engine identifies a section of the identified replication path that terminates at the particular resource. The section of the replication path terminating at the particular resource may include one or more sequences of resources. As an example, a particular resource may be Resource A, and a target resource may be Resource B. A replication path may include the following sequences: (1) Resource C→Resource A→Resource B, and (2) Resource D→Resource A→Resource B. The section of the replication path terminating at the particular resource would include the following sequences: (1) Resource C→Resource A, and (b) Resource D→Resource A.

The replication path engine identifies one or more replication paths including the candidate resource. A replication path including the candidate resource may include one or more sequences of resources. As an example, the candidate resource may be Resource A. A replication path including the candidate resource may include the following sequences: (1) Resource B→Resource A→Resource C→Resource B, and (2) Resource D→Resource E→Resource C→Resource B→Resource A→Resource C→Resource B.

The replication path engine merges (a) the section of the replication path terminating at the particular resource, and (b) the replication path including the candidate resource. The merger connects the particular resource to the candidate resource to generate a potential updated replication path. The particular resource directly precedes the candidate resource on the potential updated replication path. As an example, a particular resource may be Resource X, and a section of a replication path terminating at the particular resource may be Resource Y→Resource X. A candidate resource may be Resource A, and a replication path including the candidate resource may be Resource A→Resource B→Resource C→Resource A. A merger would connect Resource X to Resource A, as follows: Resource Y→Resource X→Resource A→Resource B→Resource C→Resource A. Additional examples for determining a potential updated replication path are described below with reference to FIGS. 6A-6C.

To determine another potential updated replication path, the replication path engine selects another particular resource from the resources directly preceding the target resource on any replication path. The replication path engine identifies a replication path including the target resource and the new particular resource. The replication path engine identifies a section of the identified replication path that terminates at the new particular resource. The replication path engine merges (a) the identified section of the identified replication path, and (b) the replication path including the candidate resource. The merger generates another potential updated replication path, wherein the new particular resource directly precedes the candidate resource. Hence, the replication path engine may determine a number of potential updated potential paths that is equal to a number of resources directly preceding the target resource on any replication path.

One or more embodiments include inquiring whether any potential updated replication paths would include any loop that is of length less than or equal to a target resiliency level (Operation 408). For each potential updated replication path, the loop analyzer (and/or the replication path engine) identifies a subset of resources, on the potential updated replication path, that correspond to a same failure domain. The loop analyzer identifies a number of hops, on the potential updated replication path, between each pair of resources in the subset of resources. The loop analyzer identifies a pair of resources, in the subset of resources, associated with the least number of hops. The section of the potential updated replication path that commences at one resource of the identified pair and terminates at the other resource of the identified pair forms a loop.

The loop analyzer determines a length of each identified loop. The loop analyzer may determine a length of a loop based on a number of hops included in the loop and/or a number of distinct failure domains included in the loop, as described above in Sections 3.A-3.B.

The loop analyzer identifies the loop having the smallest length. The replication path compares the smallest length to the target resiliency level. If the smallest length is less than or equal to the target resiliency level, then the potential updated replication path would include at least one loop of a length less than or equal to the target resiliency level. If the smallest length is not less than or equal to the target resiliency level, then the potential updated replication path would not include any loop of a length less than or equal to the target resiliency level.

If no potential updated replication path would include any loop of a length less than or equal to the target resiliency level, then the replication path engine replaces the target resource with the candidate resource for replicating at least the portion of any resource consumers corresponding to the one or more particular resources (Operation 412). In an embodiment, more than one replication path includes the target resource. The replication path engine identifies each resource directly preceding the target resource on any replication path. The replication path engine selects one or more resources from the identified resources to be transferred to one or more updated replication paths, wherein the selected resources would directly precede the candidate resource (rather than the target resource) on the updated replication paths. The candidate resource (rather than the target resource) would replicate at least a portion of any resource consumers corresponding to the selected resources.

The replication path engine may generate a data model to be applied to a constraint programming solver for selecting which resources to be transferred to updated replication paths. The solution to be found by the constraint programming solver is a solution that results in a minimum deviation across the replication loads of the target resource and the candidate resource.

The replication path engine identifies the resources directly preceding the target resource on one or more replication paths and the resources directly preceding the candidate resource on one or more replication paths (referred to herein in the aggregate as the "input resources"). The replication path engine sets up a variable to track a replication load of the target resource and a replication load of the candidate resource (referred to herein as a "load variable").

The replication path engine generates a data model that includes a bin packing constraint and a deviation constraint. The replication path engine inputs the input resources and the load variable into a bin packing constraint. The bin packing constraint outputs an allocation of the input resources to the target resource or the candidate resource, while tracking the replication load of the target resource and the replication load of the candidate resource using the load variable. Further, the replication path engine inputs the load variable into a deviation constraint. The deviation constraint constrains the deviation across the replication loads of the target resource and the candidate resource to be a smallest possible number.

A constraint programming solver accepts the data model as an input parameter. The constraint programming solver returns a solution that allocates the input resources to the target resource or the candidate resource in a way that minimizes the deviation across the replication load of the target resource and the replication load of the candidate resource. The input resources that are allocated to the target resource would precede the target resource on one or more replication paths. The input resources that are allocated to the candidate resource would precede the candidate resource on one or more replication paths. Based on the re-allocation of the input resources, the candidate resource would replace the target resource for replicating at least a portion of any resource consumers corresponding to one or more of the input resources.

Replacing the target resource with the candidate resource for replicating at least the portion of any resource consumers corresponding to a particular resource does not affect any other replication paths that include the target resource but not the particular resource. As an example, a target resource may be Resource A, a particular resource may be Resource B, and a candidate resource may be Resource D. A replication path terminating at the target resource and including the particular resource may be Resource B→Resource A. A replication path terminating at the target resource and not including the particular resource may be Resource C→Resource A. A replication path including the candidate resource may be Resource E→Resource D→Resource F→Resource E.

Continuing the example, a merger of (a) the replication path including the target resource and the particular resource and (b) the replication path including the candidate resource would generate the following potential updated replication path: Resource B→Resource D→Resource F→Resource E→Resource D. Based on the potential updated replication path, the candidate resource, Resource D (rather than the target resource, Resource A), would replicate at least a portion of any resource consumers corresponding to Resource B. Meanwhile, the other replication path including the target resource but not the particular resource (Resource C→Resource A) remains unaffected. Resource A would continue to replicate a portion of any resource consumers corresponding to Resource C.

After replacing the target resource with the candidate resource for replicating at least a portion of any resource consumers corresponding to one or more particular resources, the replication path engine determines whether to reiterate the set of operations illustrated in FIG. 4 to further improve the performance associated with the set of resources. The replication path engine inquires whether the stop condition has been satisfied. If the stop condition has not been satisfied, then the replication path engine may identify a new target resource (Operation 402). and/or may identify a new candidate resource (Operation 404). Operations 406-412 repeat with respect to the new target resource and the new candidate resource. However, if the stop condition has been satisfied, then the process ends.

If, however, one or more potential updated replication paths would include a loop of a length less than or equal to the target resiliency level, then the replication path engine refrains from replacing the target resource with the candidate resource for replicating at least the portion of any resource consumers corresponding to the one or more particular resources (Operation 410). The replication path engine determines whether to reiterate the set of operations illustrated in FIG. 4 to improve the performance associated with the set of resources. The replication path engine inquires whether the stop condition has been satisfied. If the stop condition has not been satisfied, then the replication path engine may identify a new target resource (Operation 402). and/or may identify a new candidate resource (Operation 404). Operations 406-412 repeat with respect to the new target resource and the new candidate resource. However, if the stop condition has been satisfied, then the process ends.

5. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5A:
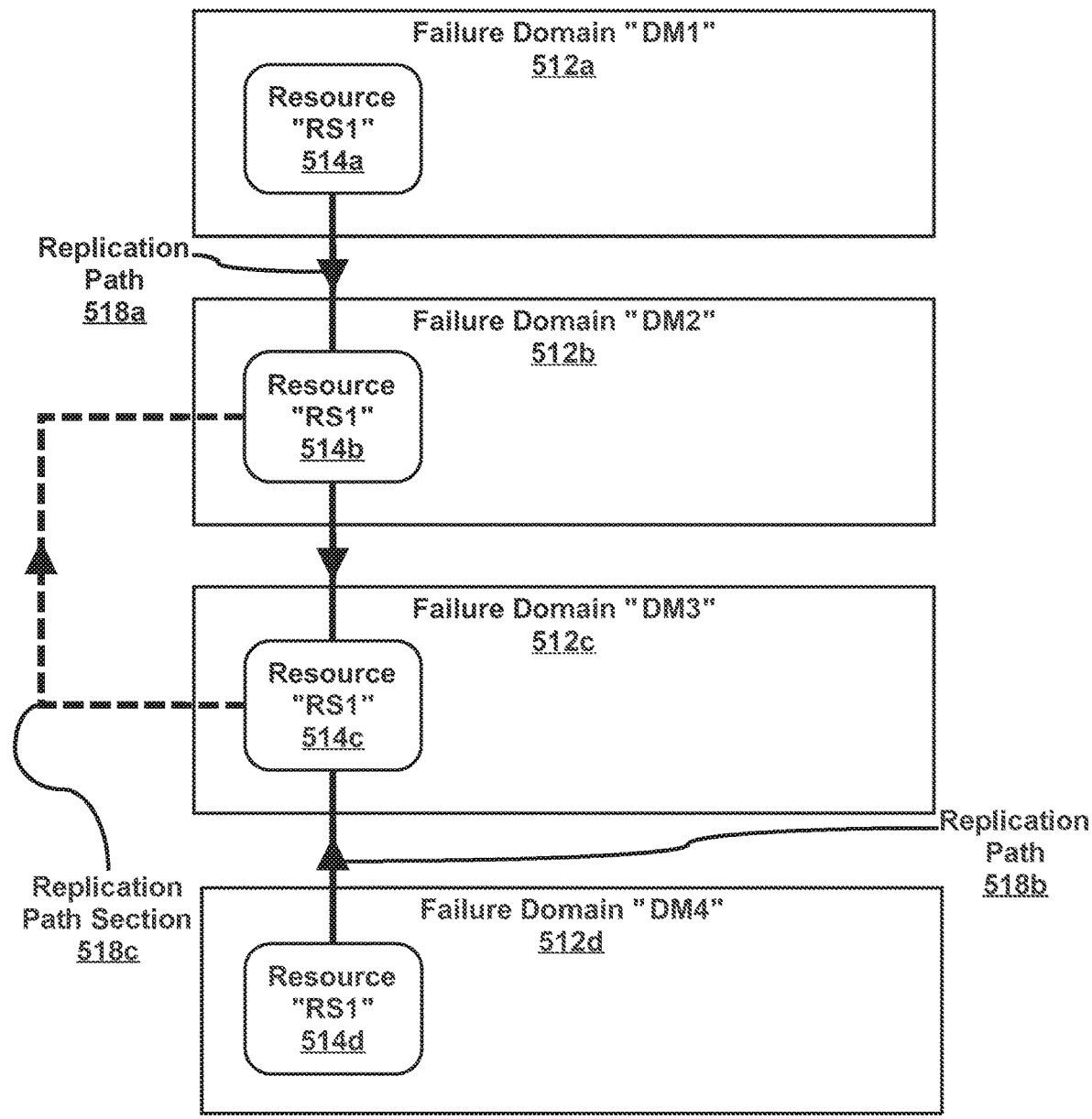
FIG. 5A illustrates an example of a candidate resource that would generate a loop, on a replication path, of a length less than or equal to the target resiliency level, in accordance with one or more embodiments.

FIG. 5A illustrates an example of a candidate resource that would generate a loop, on a replication path, of a length less than or equal to a target resiliency level. Replication path 518a includes resource 514a in failure domain 512a ("DM1:RS1"), resource 514b in failure domain 512b ("DM2:RS1"), and resource 514c in failure domain 512c ("DM3:RS1"). Replication path 518a may be expressed in textual form as DM1:RS1→DM2:RS1→DM3:RS1. Replication path 518b includes resource 514d in failure domain 512d ("DM4:RS1"), and DM3:RS1. Replication path 518b may be expressed in textual form as DM4:RS1→DM3:RS1. Additional resources of additional failure domains may be included but are not illustrated. A target resiliency level may be set to two.

A replication path engine identifies replication path 518a and replication path 518b as terminating at DM3:RS1. The replication path engine identifies DM2:RS1 as a candidate resource to be added to replication path 518a and replication path 518b. The replication path engine inquires whether adding the candidate resource DM2:RS1 would generate any loop, on replication path 518a or replication path 518b, of length less than or equal to the target resiliency level of two.

The replication path engine inquires whether there are any resources, already on replication path 518b, in the candidate failure domain DM2. The replication path engine determines that no resources on replication path 518b are in DM2.

The replication path engine inquires whether there are any resources, already on replication path 518a, in the candidate failure domain DM2. The replication path engine identifies DM2:RS1, on the existing replication path 518a, in the candidate failure domain DM2. The replication path engine determines a number of hops, on replication path 518a, from the resource DM2:RS1 to the candidate resource DM2:RS1. One hop is DM2:RS1→DM3:RS1. Another hop is DM3:RS1→DM2:RS1. The number of hops is two. The number of hops is less than or equal to the target resiliency level of two.

Since a loop, on replication path 518a, of length less than or equal to the target resiliency level would be generated, the replication path engine refrains from adding DM2:RS1 to replication path 518a and replication path 518b. Replication path section 518c, illustrated as a dotted line, is not added to replication path 518a and replication path 518b.

Figure 5B:
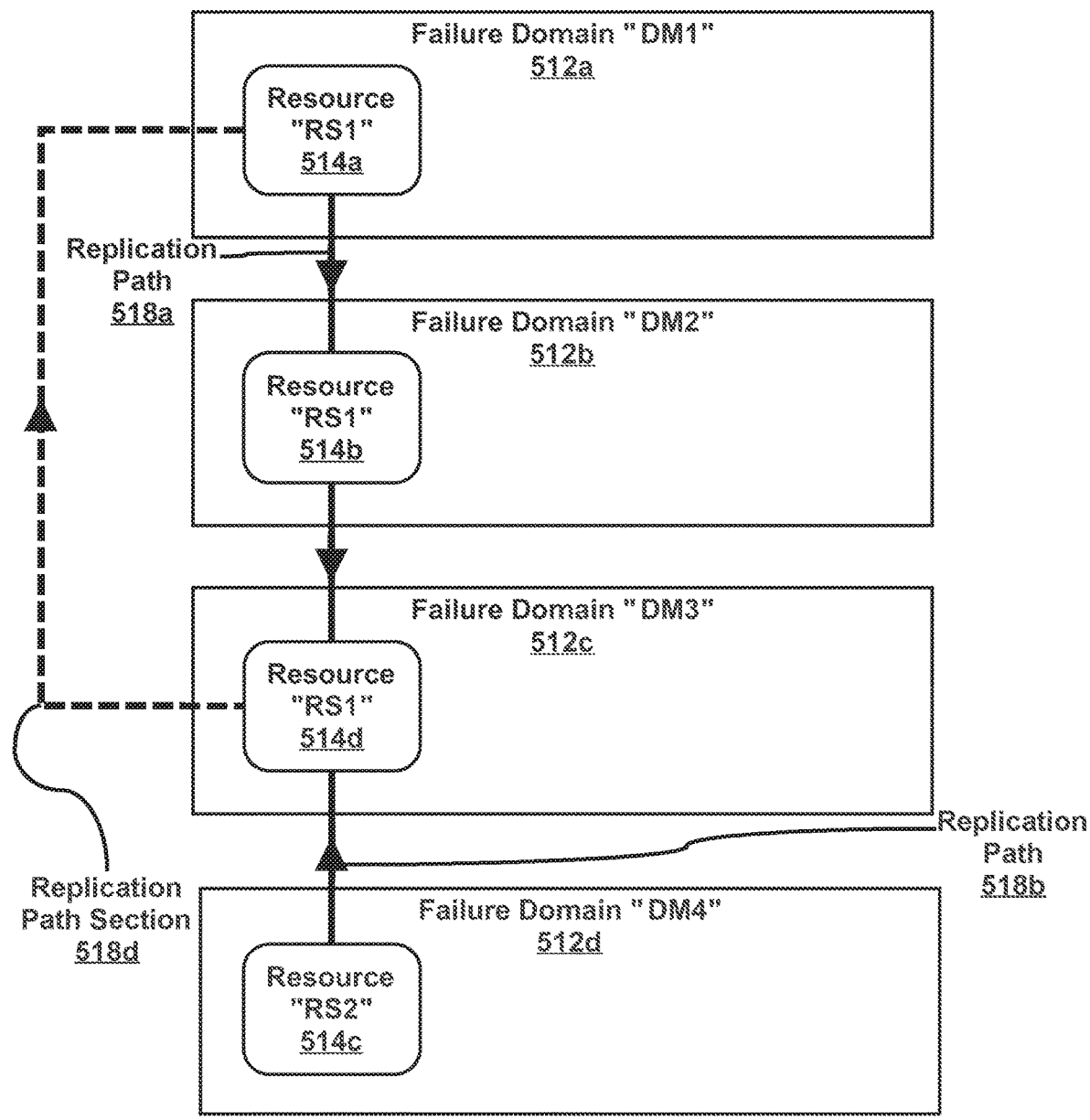
FIG. 5B illustrates an example of a different candidate resource that would not generate a loop, on the replication path, of a length less than or equal to the target resiliency level, in accordance with one or more embodiments.

FIG. 5B illustrates an example of a different candidate resource that would not generate a loop, on the replication path, of a length less than or equal to the target resiliency level. Similar to FIG. 5A, replication path 518a comprises DM1:RS1→DM2:RS1→DM3:RS1. Replication path 518b comprises DM4:RS1→DM3:RS1. A target resiliency level remains set to two.

A replication path engine identifies replication path 518a and replication path 518b as terminating at DM3:RS1. The replication path engine identifies DM1:RS1 as a candidate resource to be added to replication path 518a and replication path 518b. The replication path engine inquires whether adding the candidate resource DM1:RS1 would generate any loop, on replication path 518a or replication path 518b, of length less than or equal to the target resiliency level of two.

The replication path engine inquires whether there are any resources, already on replication path 518b, in the candidate failure domain DM1. The replication path engine determines that no resources on replication path 518b are in DM1.

The replication path engine inquires whether there are any resources, already on replication path 518a, in the candidate failure domain DM1. The replication path engine identifies DM1:RS1 in the candidate failure domain DM2. The replication path engine determines a number of hops, on replication path 518a, from the resource DM1:RS1 to the candidate resource DM1:RS1. One hop is DM1:RS1→DM2:RS1. Another hop is DM2:RS1→DM3:RS1. Another hop is DM3:RS1→DM1:RS1. The number of hops is three. The number of hops is greater than the target resiliency level of two.

Since no loop, on replication path 518a or replication path 518b, of length less than or equal to the target resiliency level would be generated, the replication path engine adds DM1:RS1 to replication path 518a and replication path 518b. Replication path section 518d, illustrated as a dotted line, is added to replication path 518a and replication path 518b.

Figure 6A:
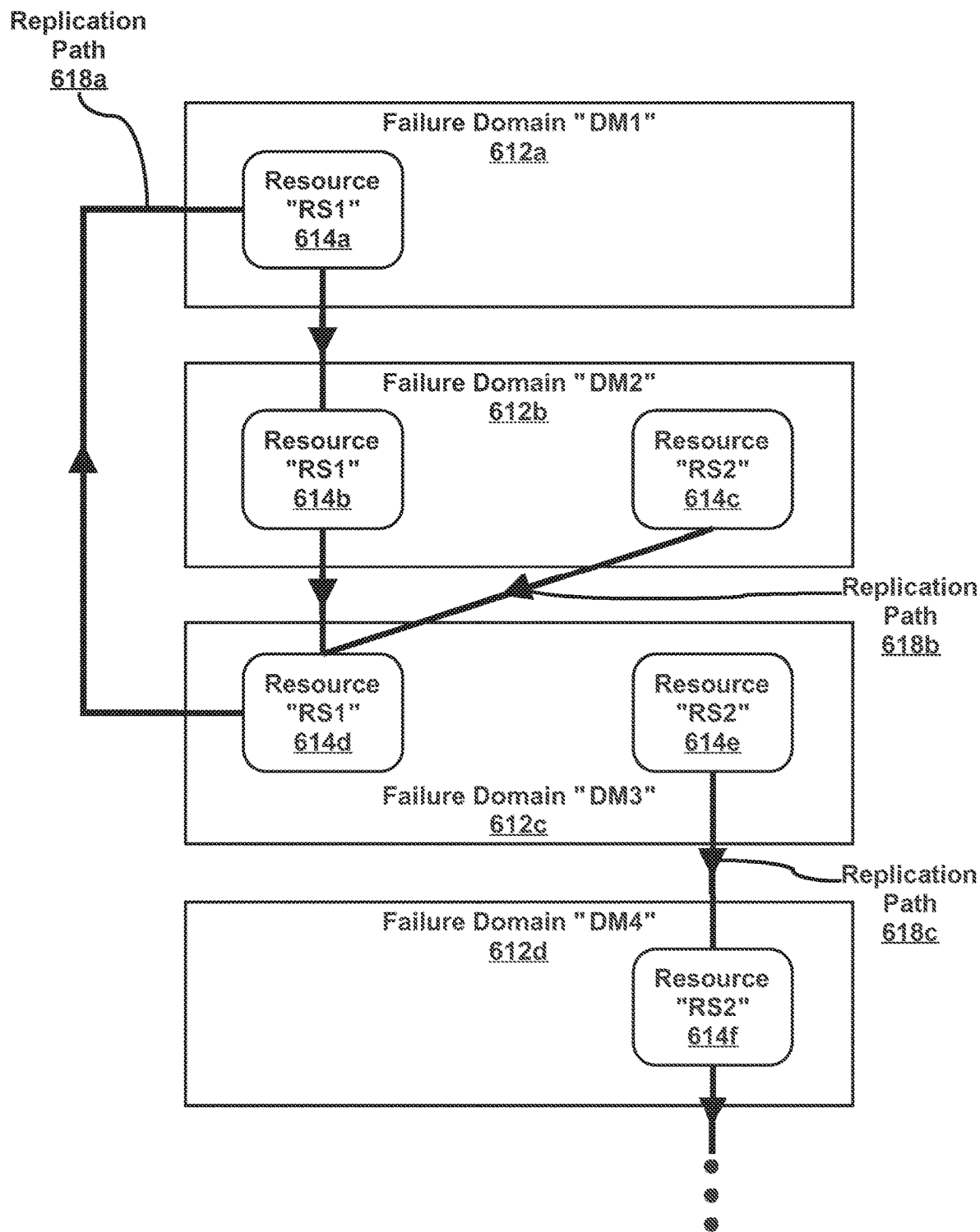
FIGS. 6A-6C illustrate examples of candidate resources for replacing a target resource on an updated replication path, in accordance with one or more embodiments.

FIG. 6A illustrates an example of a replication path including a particular resource and a target resource for replicating at least a portion of any resource consumers corresponding to a particular resource. Replication path 618a includes resource 614a in failure domain 612a ("DM1:RS1"), resource 614b in failure domain 612b ("DM2:RS1"), and resource 614d in failure domain 612c ("DM3:RS1"). Replication path 618a may be expressed in textual form as DM1:RS1→DM2:RS1→DM3:RS1→DM1:RS1. Replication path 618b includes resource 614c in failure domain 612b ("DM2:RS2"), DM3:RS1, DM1:RS1, and DM2:RS1. Replication path 618b may be expressed in textual form as DM2:RS2→DM3:RS1→DM1:RS1→DM2:RS1→DM3:RS1. Replication path 618c includes resource 614e in failure domain 612c ("DM3:RS2"), resource 614f in failure domain 612d ("DM4:RS2"), and other resources (not shown). Additional resources of additional failure domains may be included but are not illustrated. A target resiliency level that is desired to be achieved is two.

A replication load engine determines that, since 1 resource directly precedes each of DM1:RS1, DM2:RS1, and DM4:RS2 on any replication path, a replication load of each of DM1:RS1, DM2:RS1, and DM4:RS2 is 1. Similarly, the replication path engine determines that a replication load of DM3:RS1 is two. The replication path engine determines that a replication load of each of DM2:RS2 and DM3:RS2 is 0.

The replication path engine identifies DM3:RS1 as a resource with the highest replication load and determines DM3:RS1 as a target resource. Replication path 618a includes the target resource DM3:RS1 and DM2:RS1 directly preceding DM3:RS1. Replication path 618b includes the target resource DM3:RS1 and DM2:RS2 directly preceding DM3:RS1. Based on replication path 618a and replication path 618b, DM3:RS1 replicates at least a portion of any resource consumers corresponding to DM2:RS1 and at least a portion of any resource consumers corresponding to DM2:RS2.

The replication path engine identifies DM3:RS2 as a resource with the lowest replication load. The replication path engine determines DM3:RS2 as a candidate resource for replacing the target resource DM3:RS1 for replicating at least a portion of any resource consumers corresponding to DM2:RS1 and/or DM2:RS2.

The replication path engine identifies DM2:RS1 and DM2:RS2 as resources directly preceding the target resource on any replication path. The replication path engine determines a potential updated replication path for each of DM2:RS1 and DM2:RS2.

Figure 6B:
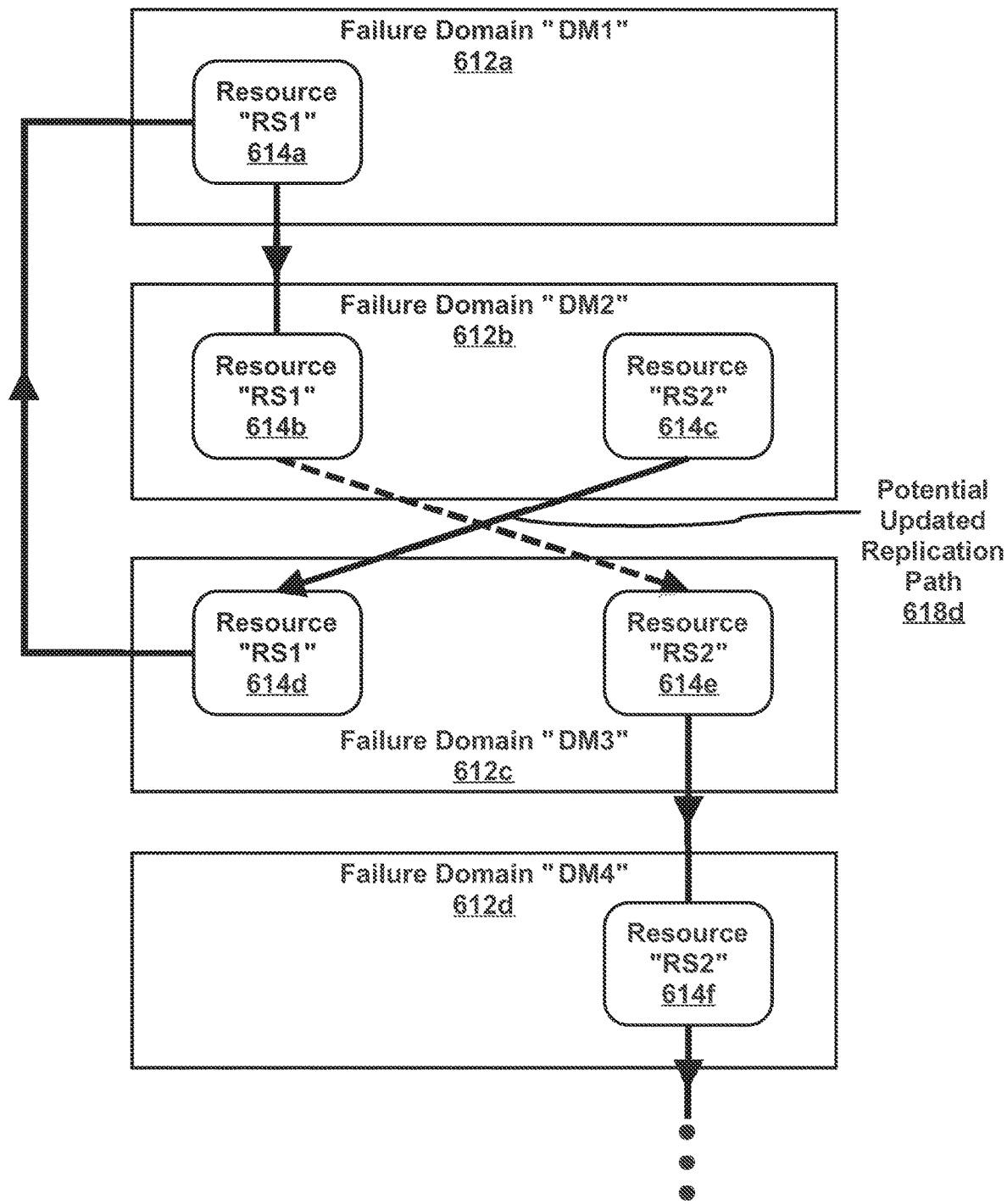

FIG. 6B illustrates a potential updated replication path if the candidate resource DM3:RS2 is selected for replacing the target resource DM3:RS1 for replicating at least a portion of any resource consumers corresponding to DM2:RS1.

To determine one potential updated replication path, the replication path engine selects DM2:RS1 as a particular resource. The replication path engine identifies that a section of a replication path that terminates at the particular resource DM2:RS1 is DM2:RS2→DM3:RS1→DM1:RS1→DM2:RS1. The replication path engine also identifies that a replication path including the candidate resource DM3:RS2 includes DM3:RS2→DM4:RS2.

The replication path engine merges (a) the section of the replication path that terminates at the particular resource DM2:RS1, and (b) the replication path including the candidate resource DM3:RS2. The merger connects the particular resource DM2:RS1 to the candidate resource DM3:RS2 to generate a potential updated replication path 618*d*. The potential updated replication path 618*d* is: DM2: RS2→DM3:RS1→DM1:RS1→DM2:RS1 DM3: RS2→DM4:RS2. As illustrated, a replication path section DM2:RS1→DM3:RS1 has been removed and replaced with another replication section DM2:RS1→DM3:RS2, which is illustrated as a dotted line.

Figure 6C:
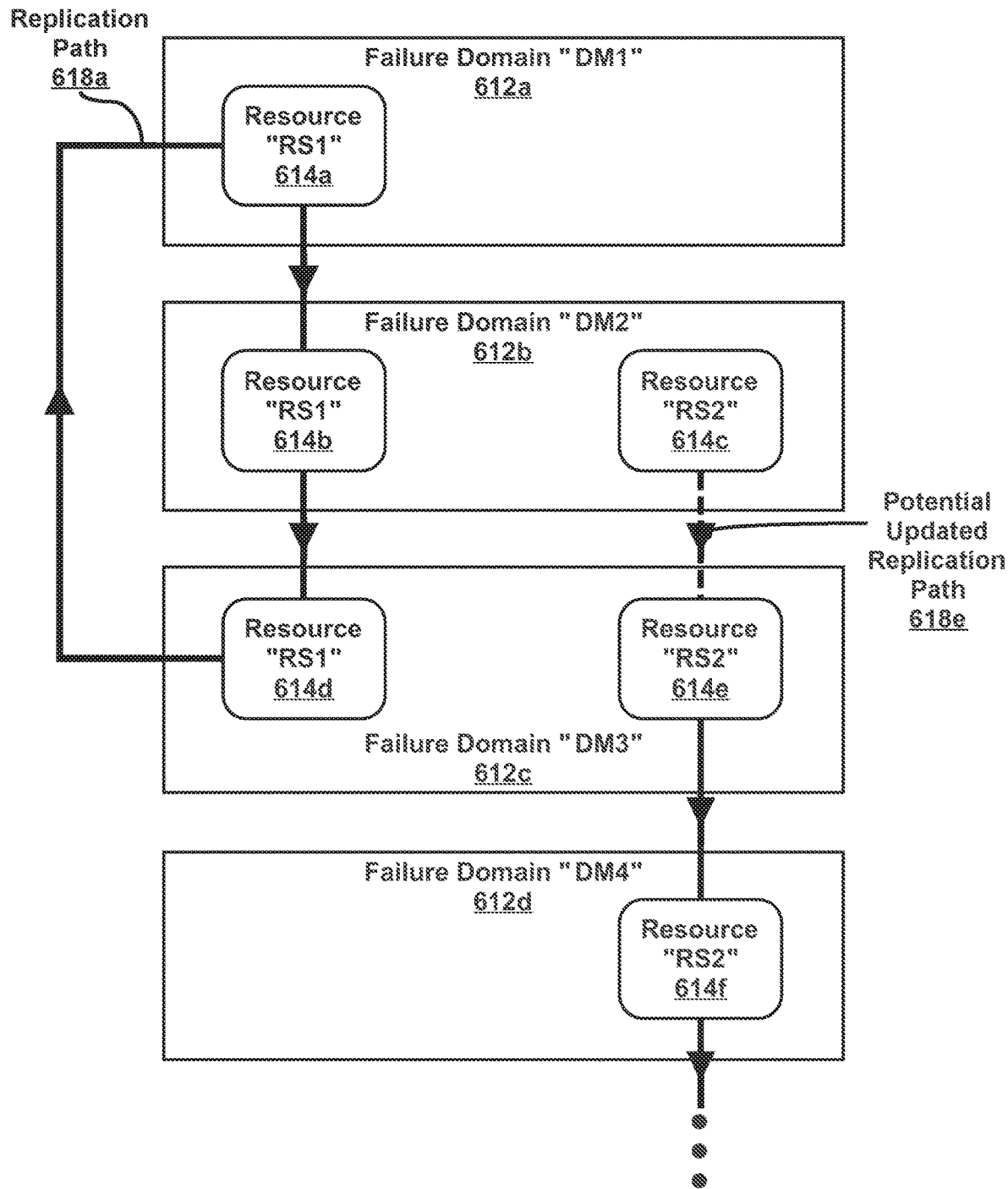

FIG. 6C illustrates another potential updated replication path if the candidate resource DM3:RS2 is selected for replacing the target resource DM3:RS1 for replicating at least a portion of any resource consumers corresponding to DM2:RS2.

To determine another potential updated replication path, the replication path engine selects DM2:RS2 as a particular resource. The replication path engine identifies that a section of a replication path that terminates at the particular resource DM2:RS2 is DM2:RS2. The replication path engine also identifies that a replication path including the candidate resource DM3:RS2 includes DM3:RS2→DM4:RS2.

The replication path engine merges (a) the section of the replication path that terminates at the particular resource DM2:RS2, and (b) the replication path including the candidate resource DM3:RS2. The merger connects the particular resource DM2:RS2 to the candidate resource DM3:RS2 to generate a potential updated replication path 618*e*. The potential updated replication path 618*e* is: DM2: RS2→DM3:RS2→DM4:RS2. As illustrated, a replication path section DM2:RS2→DM3:RS1 has been removed and replaced with another replication section DM2:RS2→DM3: RS2, which is illustrated as a dotted line.

The replication path engine inquires whether any potential updated replication path would include any loop of length less than or equal to the target resiliency level of two. The replication path engine determines that no loop would be generated on potential updated replication path 618*d*. The replication path engine determines that no loop would be generated on potential updated replication path 618*e*. The replication path engine determines that no potential updated replication path would include any loop of length less than or equal to the target resiliency level of two.

The replication path engine identifies each resource directly preceding the target resource DM3:RS1 on any replication path as DM2:RS1 and DM2:RS2. The replication path engine selects one or more resources from the identified resources to be transferred to one or more updated replication paths, wherein the selected resources would directly precede the candidate resource DM3:RS2 (rather than the target resource DM3:RS1) on the updated replication paths.

The replication path engine generates a data model to be applied to a constraint programming solver for determining which resources to be transferred to updated replication paths. The replication path engine identifies DM2:RS1 and DM2:RS2 as the resources directly preceding the target resource or the candidate resource on any replication path. DM2:RS1 and DM2:RS2 are referred to herein as the input resources. The replication path engine sets up a variable to track a replication load of the target resource DM3:RS1 and a replication load of the candidate resource DM3:RS2. The variable is referred to herein as the load variable.

The replication path engine inputs the input resources and the load variable into a bin packing constraint. The replication path engine inputs the load variable into a deviation constraint. The replication path engine generates a data model including the bin packing constraint and the deviation constraint.

A constraint programming solver accepts the data model as an input parameter. The constraint programming solver returns a solution that allocates the input resources to the target resource DM3:RS1 or the candidate resource DM3: RS2 in a way that minimizes the deviation across the replication load of the target resource DM3:RS1 and the replication load of the candidate resource DM3:RS2. The solution may allocate the input resource DM2:RS1 to the target resource DM3:RS1, and may allocate the input resource DM2:RS2 to the candidate resource DM3:RS2. Based on the solution, the replication load of the target resource DM3:RS1 would be 1, and the replication load of the candidate resource DM3:RS2 would be 1. A deviation across the replication loads of the target resource DM3:RS1 and the candidate resource DM3:RS2 would be zero (0).

Based on the solution, DM2:RS1 would precede DM3: RS1 on a replication path 618*a*, and DM2:RS2 would precede DM3:RS2 on a replication path 618*e*, as illustrated in FIG. 6C. Based on the re-allocation of the input resources, the candidate resource DM3:RS2 replaces the target resource DM3:RS1 for replicating at least a portion of any resource consumers corresponding to DM2:RS2.

Based on the replication paths illustrated in FIG. 6C, a deviation across replication loads of DM1:RS1, DM2:RS1, DM2, RS2, DM3:RS1, DM3:RS2, DM4:RS2 (and other resources, which are not illustrated) is determined. The deviation across the replication loads illustrated in FIG. 6C is smaller than the deviation across the replication loads illustrated in FIG. 6A. Hence, by replacing DM3:RS1 with DM3:RS2 to replicate at least a portion of any resource consumers corresponding to DM2:RS2, both a local deviation (a deviation across the replication loads of the affected resources, DM3:RS1 and DM3:RS2) and a global deviation (a deviation across the replication loads of all resources) are reduced.

Operations for modifying the replication paths may be reiterated until the global deviation reaches zero (0). Based on the replication paths illustrated in FIG. 6C, the replication path engine selects a resource with the highest replication load as a new target resource, and a resource with the lowest replication load as a new candidate resource. The replication path engine repeats the process described above with respect to the new target resource and the new candidate resource.

6. CLOUD ENVIRONMENTS

In one or more embodiments, a cloud environment provides a pool of resources that are shared amongst multiple client devices. Examples of resources include a processor, a server, a data storage, a virtual machine, and a platform. Client devices may independently request computing services, such as server time and network storage, as needed. The resources are dynamically assigned to the requests and/or client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants"). Several tenants may use a same particular resource, such as a server, at different times and/or at the same time. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In a multi-tenant environment, where multiple tenants share a same pool of resources 112, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
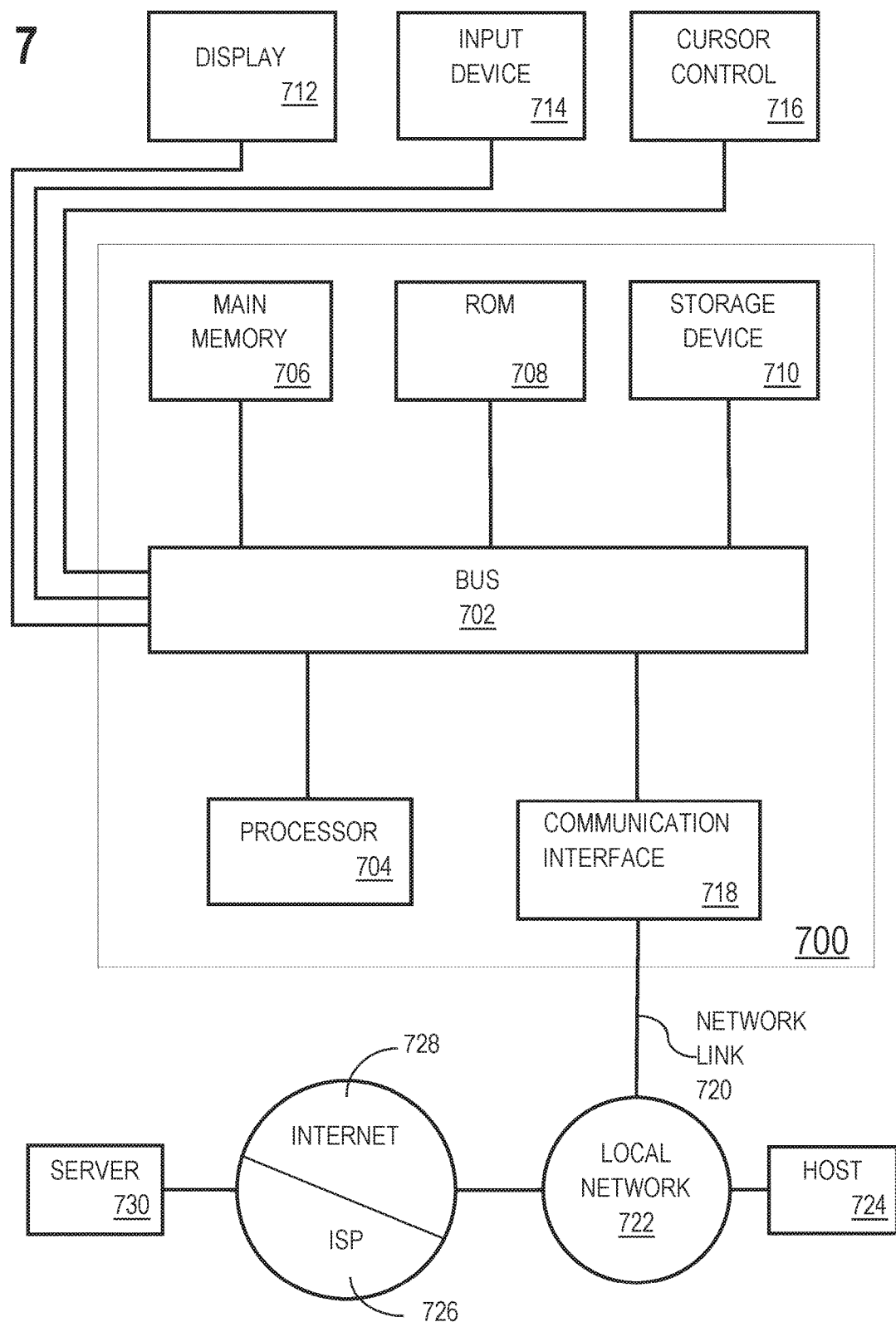
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   identifying a replication path including a set of three or more resources in an ordered sequence, wherein the replication path indicates that each particular resource, of the set of resources, is selected for replicating one or more resource consumers corresponding to a respective subset of the set of resources preceding the particular resource on the replication path, and the particular respective subset of the set of resources includes two or more resources;
   identifying a candidate resource for adding to the replication path;
   determining whether adding the candidate resource to the replication path would generate any loop, on the replication path, that is of a length that is less than or equal to a target resiliency level;
   responsive at least to determining that adding the candidate resource to the replication path would not generate any loop, on the replication path, that is of the length that is less than or equal to the target resiliency level:
      adding the candidate resource to the replication path, wherein adding the candidate resource to the replication path indicates selecting the candidate resource for replicating one or more resource consumers corresponding to at least a last resource and a second-to-last resource in the set of resources in the ordered sequence.

2. The medium of claim 1, wherein determining whether adding the candidate resource to the replication path would generate any loop, on the replication path, that is of the length that is less than or equal to the target resiliency level comprises:
   determining whether any resources, of the set of resources already on the replication path, is associated with a same failure domain as the candidate resource;
   responsive to determining that no resources, of the set of resources already on the replication path, is associated with the same failure domain as the candidate resource:
      determining that adding the candidate resource to the replication path would not generate any loop, on the replication path, that is of the length that is less than or equal to the target resiliency level.

3. The medium of claim 1, wherein determining whether adding the candidate resource to the replication path would generate any loop, on the replication path, that is of the length that is less than or equal to the target resiliency level comprises:
   determining that a first resource, of the set of resources already on the replication path, is associated with a same failure domain as the candidate resource;
   identifying a loop that would be generated by adding the candidate resource to the replication path, wherein the loop comprises a subset of the set of resources already on the replication path, starting at the first resource and ending at the last resource in the ordered sequence;
   determining whether the length of the loop is less than or equal to the target resiliency level.

4. The medium of claim 3, wherein determining whether the length of the loop is less than or equal to the target resiliency level comprises:
   determining a number of hops on the loop that would be generated by adding the candidate resource to the replication path; and
   determining whether the number of hops is less than or equal to the target resiliency level.

5. The medium of claim 3, wherein determining whether the length of the loop is less than or equal to the target resiliency level comprises:
   determining a number of failure domains corresponding to each of the subset of resources already on the replication path, starting at the first resource and ending at the last resource in the ordered sequence; and
   determining whether the number of failure domains is less than or equal to the target resiliency level.

6. The medium of claim 1, wherein identifying the replication path including the set of resources in the ordered sequence comprises aggregating a plurality of replication paths that terminate at a same resource.

7. The medium of claim 1, wherein identifying the candidate resource for adding to the replication path is responsive at least to determining that the candidate resource is associated with a different failure domain than the last resource in the set of resources that are in the ordered sequence.

8. The medium of claim 1, wherein identifying the candidate resource for adding to the replication path is based on a physical distance between (a) a first physical machine that executes the last resource in the set of resources that are in the ordered sequence and (b) a second physical machine that executes the candidate resource.

9. The medium of claim 1, wherein identifying the candidate resource for adding to the replication path comprises identifying a particular failure domain that would be associated with the candidate resource when the candidate resource is initiated.

10. The medium of claim 1, wherein the operations further comprise:
   identifying a first subset of the set of resources that precede the last resource on the replication path, wherein a first number of resources in the first subset of the set of resources equals the target resiliency level;

based on the replication path, replicating resource consumers corresponding to each of the first subset of the set of resources onto the last resource.

11. The medium of claim 10, wherein the operations further comprise:

subsequent to adding the candidate resource to the replication path:

identifying a second subset of the set of resources that precede the candidate resource on the replication path, wherein a second number of resources in the second subset of the set of resources equals the target resiliency level;

based on the replication path, replicating resource consumers corresponding to each of the second subset of the set of resources onto the candidate resource.

12. The medium of claim 10, wherein resource consumers corresponding to each of the first subset of the set of resources comprise resource consumers whose primary instance executes on each of the first subset of the set of resources.

13. The medium of claim 1, wherein the candidate resource to be added on the replication path replaces a particular resource already on the replication path.

14. The medium of claim 1, wherein the operations further comprise:

identifying a particular resource in the set of resources on the replication path to be potentially removed from the replication path;

further responsive at least to determining that adding the candidate resource to the replication path would not generate any loop, on the replication path, that is of the length that is less than or equal to the target resiliency level: removing the particular resource from the replication path such that the candidate resource replaces the particular resource on the replication path.

15. The medium of claim 14, wherein identifying the particular resource in the set of resources on the replication path is responsive at least to determining that the particular resource is associated with a highest replication load out of the set of resources on the replication path.

16. The medium of claim 1, wherein the target resiliency level indicates a maximum number of failure domains that are allowed to fail in a computing environment while each resource consumer implemented in the computing environment remains accessible.

17. The medium of claim 1, wherein the target resiliency level is achieved in a computing environment if each resource consumer is implemented across a number of failure domains, in the computing environment, that is at least one greater than the target resiliency level.

18. The medium of claim 1, wherein:

determining whether adding the candidate resource to the replication path would generate any loop, on the replication path, that is of the length that is less than or equal to the target resiliency level comprises:

determining that a first resource, of the set of resources already on the replication path, is associated with a same failure domain as the candidate resource;

identifying a loop that would be generated by adding the candidate resource to the replication path, wherein the loop comprises a subset of the set of resources already on the replication path, starting at the first resource and ending at the last resource in the ordered sequence;

determining a number of hops on the loop that would be generated by adding the candidate resource to the replication path; and determining whether the number of hops is less than or equal to the target resiliency level;

identifying the candidate resource for adding to the replication path is responsive at least to determining that the candidate resource is associated with a different failure domain than the last resource in the set of resources that are in the ordered sequence;

identifying the candidate resource for adding to the replication path is based on a physical distance between (a) a first physical machine that executes the last resource in the set of resources that are in the ordered sequence and (b) a second physical machine that executes the candidate resource;

the target resiliency level indicates a maximum number of failure domains that are allowed to fail in a computing environment while each resource consumer implemented in the computing environment remains accessible;

the target resiliency level is achieved in a computing environment if each resource consumer is implemented across a number of failure domains, in the computing environment, that is at least one greater than the target resiliency level;

the operations further comprise:

identifying a first subset of the set of resources that precede the last resource on the replication path, wherein a first number of resources in the first subset of the set of resources equals the target resiliency level;

based on the replication path, replicating resource consumers corresponding to each of the first subset of the set of resources onto the last resource, wherein resource consumers corresponding to each of the first subset of the set of resources comprise resource consumers whose primary instance executes on each of the first subset of the set of resources;

identifying a second subset of the set of resources that precede the candidate resource on the replication path, wherein a second number of resources in the second subset of the set of resources equals the target resiliency level; and based on the replication path, replicating resource consumers corresponding to each of the second subset of the set of resources onto the candidate resource.

19. A method, comprising:

identifying a replication path including a set of three or more resources in an ordered sequence, wherein the replication path indicates that each particular resource, of the set of resources, is selected for replicating one or more resource consumers corresponding to a respective subset of the set of resources preceding the particular resource on the replication path, and the particular respective subset of the set of resources includes two or more resources;

identifying a candidate resource for adding to the replication path;

determining whether adding the candidate resource to the replication path would generate any loop, on the replication path, that is of a length that is less than or equal to a target resiliency level;

responsive at least to determining that adding the candidate resource to the replication path would not generate any loop, on the replication path, that is of the length that is less than or equal to the target resiliency level:

adding the candidate resource to the replication path, wherein adding the candidate resource to the replication path indicates selecting the candidate resource for replicating one or more resource consumers corresponding to at least a last resource and a second-to-last resource in the set of resources in the ordered sequence;

wherein the method is implemented by at least one device including a hardware processor.

20. A system, comprising:

at least one device including a hardware processor; and the system being configured to perform operations comprising:

identifying a replication path including a set of three or more resources in an ordered sequence, wherein the replication path indicates that each particular resource, of the set of resources, is selected for replicating one or more resource consumers corresponding to a respective subset of the set of resources preceding the particular resource on the replication path, and the particular respective subset of the set of resources includes two or more resources;

identifying a candidate resource for adding to the replication path;

determining whether adding the candidate resource to the replication path would generate any loop, on the replication path, that is of a length that is less than or equal to a target resiliency level;

responsive at least to determining that adding the candidate resource to the replication path would not generate any loop, on the replication path, that is of the length that is less than or equal to the target resiliency level: adding the candidate resource to the replication path, wherein adding the candidate resource to the replication path indicates selecting the candidate resource for replicating one or more resource consumers corresponding to at least a last resource and a second-to-last resource in the set of resources in the ordered sequence.

* * * * *